(12) United States Patent
Dhillon

(10) Patent No.: US 12,308,020 B2
(45) Date of Patent: May 20, 2025

(54) PROCESSING CONCURRENTLY RECEIVED UTTERANCES FROM MULTIPLE USERS

(71) Applicant: GOOGLE LLC, Mountain View, CA (US)

(72) Inventor: Neil Dhillon, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 276 days.

(21) Appl. No.: 17/782,496

(22) PCT Filed: Dec. 11, 2019

(86) PCT No.: PCT/US2019/065619
§ 371 (c)(1),
(2) Date: Jun. 3, 2022

(87) PCT Pub. No.: WO2021/118549
PCT Pub. Date: Jun. 17, 2021

(65) Prior Publication Data
US 2023/0169959 A1  Jun. 1, 2023

(51) Int. Cl.
*G10L 15/18* (2013.01)
*G06F 3/16* (2006.01)
*G10L 15/22* (2006.01)

(52) U.S. Cl.
CPC .............. *G10L 15/18* (2013.01); *G06F 3/167* (2013.01); *G10L 15/22* (2013.01); *G10L 2015/223* (2013.01)

(58) Field of Classification Search
CPC ... G10L 15/18; G10L 15/22; G10L 2015/223; G06F 3/167
See application file for complete search history.

(56) References Cited

U.S. PATENT DOCUMENTS 8,896,556 B2 * 11/2014 Frazier ................ G06F 3/04886
345/173
9,082,407 B1 * 7/2015 Faaborg .................. G10L 25/48
(Continued)

OTHER PUBLICATIONS

Intellectual Property India; First Examination Report issued in Application No. 202227029223; 7 pages; dated Oct. 11, 2022.
(Continued)

*Primary Examiner* — Bhavesh M Mehta
*Assistant Examiner* — Nandini Subramani
(74) *Attorney, Agent, or Firm* — Gray Ice Higdon

(57) ABSTRACT

Implementations set forth herein relate to an automated assistant that is responsive to spoken utterances spoken by multiple different users simultaneously, or otherwise within a narrow window of time, in furtherance of initializing one or more actions. For instance, when a primary user is interacting with an automated assistant, a secondary user may also provide a spoken utterance. In response, the automated assistant can selectively determine whether any input from the secondary user should affect a request from the primary user. In some instances, the automated assistant can elect to either disregard the secondary input, separately respond to the secondary input, or use some amount of (Continued)

content of the secondary input to further the request from the primary user. Incorporation of secondary input when fulfilling a primary request can be fluidly performed to resemble human conversation and eliminate any unnecessary engagement between the automated assistant and the users.

18 Claims, 15 Drawing Sheets

(56) References Cited

U.S. PATENT DOCUMENTS

| | | | | |
|---|---|---|---|---|
| 9,293,141 | B2* | 3/2016 | Contolini | A61B 1/0004 |
| 9,378,740 | B1 | 6/2016 | Rosen et al. | |
| 9,576,574 | B2* | 2/2017 | van Os | G10L 15/22 |
| 9,639,322 | B2* | 5/2017 | Osawa | G01C 21/3608 |
| 9,961,410 | B1 | 5/2018 | Wang | |
| 10,741,181 | B2* | 8/2020 | Garg | G10L 15/1815 |
| 10,944,588 | B2* | 3/2021 | Iyengar | G10L 15/07 |
| 11,232,155 | B2* | 1/2022 | Ni | G06F 16/3334 |
| 11,627,189 | B2* | 4/2023 | Bao | H04L 67/535 |
| | | | | 704/275 |
| 2002/0055844 | A1* | 5/2002 | L'Esperance | G06F 3/165 |
| | | | | 704/E15.045 |
| 2008/0114603 | A1* | 5/2008 | Desrochers | G10L 15/22 |
| | | | | 704/E15.04 |
| 2015/0039317 | A1* | 2/2015 | Klein | G06F 3/167 |
| | | | | 704/275 |
| 2015/0162020 | A1 | 6/2015 | Deshmukh et al. | |
| 2015/0254057 | A1* | 9/2015 | Klein | H04N 21/4668 |
| | | | | 704/275 |
| 2018/0233139 | A1* | 8/2018 | Finkelstein | G10L 25/51 |
| 2018/0307504 | A1* | 10/2018 | Aggarwal | G06F 3/167 |
| 2019/0012142 | A1* | 1/2019 | Bang | H04M 1/724 |
| 2019/0095050 | A1* | 3/2019 | Gruber | B60K 35/26 |
| 2019/0325865 | A1 | 10/2019 | Oktem et al. | |
| 2023/0153060 | A1* | 5/2023 | Mene | G06F 3/167 |
| | | | | 715/728 |

OTHER PUBLICATIONS

European Patent Office; Extended European Search Report issued in Application No. 22165972.5, 7 pages, dated Jul. 13, 2022.
Trippas, Johanne R. et al., Towards a Model for Spoken Conversational Search, arxiv.org, Cornell University Library, 201 Olin Library Cornell University Ithaca, NY 14853, XP081522421, 44 pages, dated Oct. 30, 2019.
European Patent Office; Invitation to Pay Additional Fees; PCT Ser. No. PCT/US2019/065619; 13 pages; dated Aug. 3, 2020.
European Patent Office; International Search Report and Written Opinion of PCT Ser. No. PCT/US2019/065619; 16 pages; dated Sep. 24, 2020.
Machupalli, V.; Who's Speaking? : Speaker Diarization with Watson Speech-to-Text API; IBM Cloud Blog; retrieved from internet https://www.ibm.com/cloud/blog/whos-speaking-speaker-diarization-watson-speech-text-api; 8 pages; dated May 17, 2017.
Intellectual Property India; Hearing Notice issued in Application No. 202227029223; 4 pages; dated Nov. 29, 2024.
European Patent Office; Communication pursuant to Article 94(3) EPC issued in Application No. 22165972.5, 5 pages, dated Sep. 9, 2024.

* cited by examiner

PROCESSING CONCURRENTLY RECEIVED UTTERANCES FROM MULTIPLE USERS

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

An automated assistant that is accessible via a standalone computing device can serve a variety of different users at different times in order to orchestrate tasks for the users. This can be especially useful in households, workplaces, and/or other environments where a standalone computing device is operating and various users engage the automated assistant at different times in order to perform various tasks. However, in such environments, there may be frequent occurrences of multiple users providing spoken utterances to an automated assistant at the same time. Current automated assistant processing of separate spoken utterances can present various drawbacks. As one example, some processing may not differentiate between the two separate spoken utterances, and instead process the separate spoken utterances as if they were a single utterance. This can cause the automated assistant to perform incorrect action(s) and/or fail to perform the actions requested in either of the spoken utterances. Performing the incorrect action(s) leads to waste of various computational and/or network resources. Moreover, failing to perform the actions requested in either of the spoken utterances will require the users to again provide the utterances, prolonging the interaction with the automated assistant, and prolonging associated usage of computational and network resources.

As another example, some processing may differentiate between the two separate spoken utterances using fixed criteria, and only further process one of the spoken utterance while wholly ignoring/filtering out the other spoken utterance. Accordingly, the other spoken utterance may not be processed (e.g., using speech-to-text and/or natural language understanding components) by the automated assistant. While this might result in expected automated assistant performance in some situations—in other situations, it may instead be the case that the other unprocessed spoken utterance is intended for the automated assistant (while the processed spoken utterance was not) and/or that the other unprocessed spoken utterance is intended to supplement the processed spoken utterance. Accordingly, in such other situations, the other unprocessed spoken utterances will be required to again be provided, thereby prolonging the interaction with the automated assistant, and prolonging associated usage of computational and network resources.

SUMMARY

Implementations set forth herein relate to an automated assistant that can determine whether to combine multiple requests, and/or selectively respond to one or more requests, embodied in spoken utterances from multiple users who are concurrently and/or sequentially speaking. For instance, the automated assistant can be responsive to an individual request determined to be directed at the automated assistant when multiple users are concurrently speaking utterances that embody multiple requests—but, when not all of the requests are intended for the automated assistant. Alternatively, or additionally, the automated assistant can be responsive to multiple requests determined to be directed to the automated assistant, despite the requests being concurrently submitted via spoken utterances from multiple different users. Providing an automated assistant with such capabilities can allow the automated assistant to be responsive to conversational-type inputs from users, and also reduce an amount of time necessary for users to interact with the automated assistant to initialize certain actions. In some implementations, spoken utterances provided from different users can be separately embodied in selectable elements rendered at a GUI, thereby allowing a user to select one or multiple spoken utterance for the automated assistant to be responsive to. Furthermore, in many instances when users provide multiple simultaneous inputs to an automated assistant, the automated assistant can consider context(s) gleaned from the multiple inputs in order determine how to more accurately respond to those inputs without prompting users to explicitly provide further details.

As an example, a first user can provide a spoken utterance such as, "Could you turn down the thermostat, Assistant?" While the first user is actively providing the spoken utterance, and/or within a time window of the spoken utterance, a second user can provide another spoken utterance such as, "And, also the lights." In some instances, audio data can be generated by a computing device receiving the spoken utterances, and a portion of the audio data can characterize the first user actively speaking at the same time as the second user is speaking. Initially, the automated assistant can optionally determine whether the first user is verified with the automated assistant and is therefore approved to control the automated assistant via spoken utterances. Additionally, the automated assistant can determine whether the second user is also verified with the automated assistant.

When the first user is determined to be verified, the automated assistant can proceed with initializing one or more actions that may be necessary for fulfilling a request from the first user (e.g., turning down the thermostat). Furthermore, when the second user is determined to be verified, the automated assistant can attempt to identify a particular request that the second user is attempting to have fulfilled. In isolation, and/or without any other context or spoken utterances, the other spoken utterance from the second user (e.g., "And, also the lights.") may not be actionable by the automated assistant. However, because the first user and the second user are verified and have provided their spoken utterances within a particular time window, the other spoken utterance can be actionable by the automated assistant in view of the request from the first user. For example, contextual data characterizing the one or more actions initialized by the first user, and/or any other information that may characterize a context in which the first user provided the spoken utterance, can be considered by the automated assistant when responding to the second user. In this manner, there may be an improvement in the reliability and responsiveness of the automated assistant to different user requests, while simultaneously retaining the capability to distinguish between users and thus maintain security, for example.

In some implementations, a function that is executed in response to the spoken utterance from the first user can include turnDown([device], [time]). In response to the first user providing the spoken utterance, the function can be initialized by the automated assistant as "turnDown([thermostat], [time(0)])," which can identify the thermostat as the device to "turn down" immediately in response to the spoken utterance. This function can be identified in contextual data that can be considered when attempting to respond to the other spoken utterance from the second user. For example, the automated assistant can determine whether the other spoken utterance (e.g., "And, also the lights.") identifies a parameter or slot value that is suitable for the function. When the automated assistant determines that the second user has identified a slot value suitable for the function corresponding to the request from the first user, the automated assistant can initialize execution of the function using the slot value. As a result, the automated assistant can execute a function such as "turnDown([lights], [time(0)])" in order to cause lights in a home of the first user and the second user to reduce in brightness.

In some implementations, when the first user is providing the spoken utterance to a computing device that includes a touch display panel, the spoken utterance from the first user and the other spoken utterance from the second user can be visibly rendered at the display panel. In some implementations, audio data characterizing the spoken utterance and the other spoken utterance can be processed according to a speaker diarization process in order to separately identify characteristics (e.g., characteristics identified in user profile(s)) of each spoken utterance embodied by the audio data. A natural language representation of each spoken utterance can then be separately rendered at the display panel, thereby allowing a user to select one or more spoken utterances for the automated assistant to be responsive to.

As an example, a first user can be a verified user that provides a spoken utterance such as, "Assistant, how many tablespoons are in a cup?" Simultaneously, or shortly thereafter, a second unverified user can provide another spoken utterance to the computing device that is providing access to the automated assistant. An unverified user can be a user that does not have an account with permissions to control particular functions of the automated assistant. The second user can provide the other spoken utterance, which can be "Also, how much does a cup of salt weight?" The automated assistant can cause the touch display panel of the computing device to a first textual rendering in a first selectable element characterizing the spoken utterance "Assistant, how many tablespoons are in a cup?" and a second textual rendering in a second selectable element characterizing the other spoken utterance, "Also, how much does a cup of salt weight?"

Despite the second user being unverified, the first user can select the second selectable element in order to cause performance of one or more actions corresponding to the second spoken utterance. Alternatively, the first user can bypass selecting either of the first selectable element and the second selectable element in order that the automated assistant will perform one or more other actions corresponding to just the spoken utterance from the first user. Optionally, the one or more actions corresponding to the other spoken utterance from the second user can be bypassed unless the first user selects the second selectable element, at least because the second user is unverified. Furthermore, if the first user performs gestures to select the first selectable element and the second selectable element, the automated assistant can initialize performance of actions corresponding to requests embodied in the spoken utterance and the other spoken utterance.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
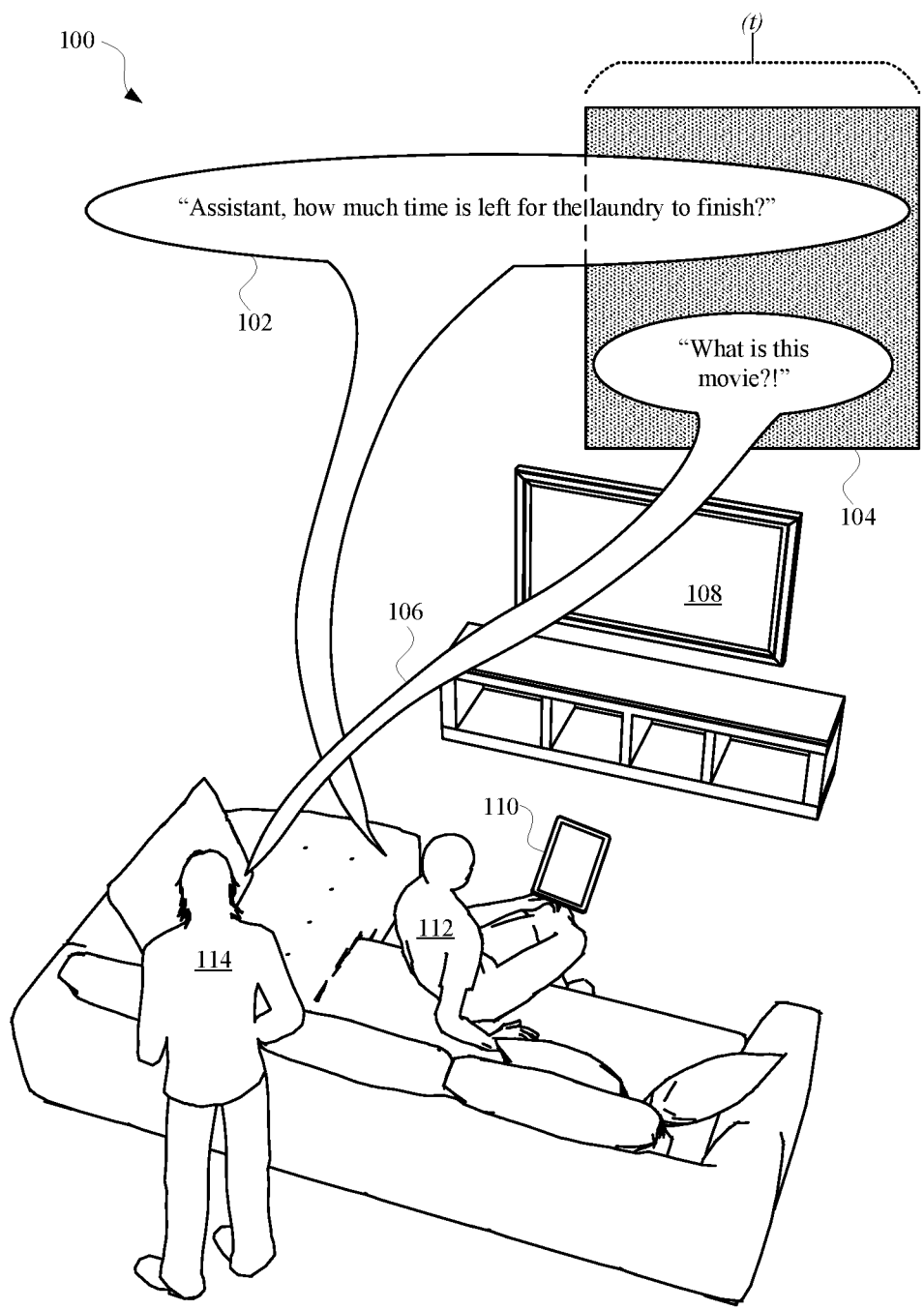
FIG. 1A, FIG. 1B, and FIG. 1C illustrate views of multiple users interacting with an automated assistant, and thereby causing the automated assistant to distinguish between who is invoking the automated assistant.
Figure 1B:
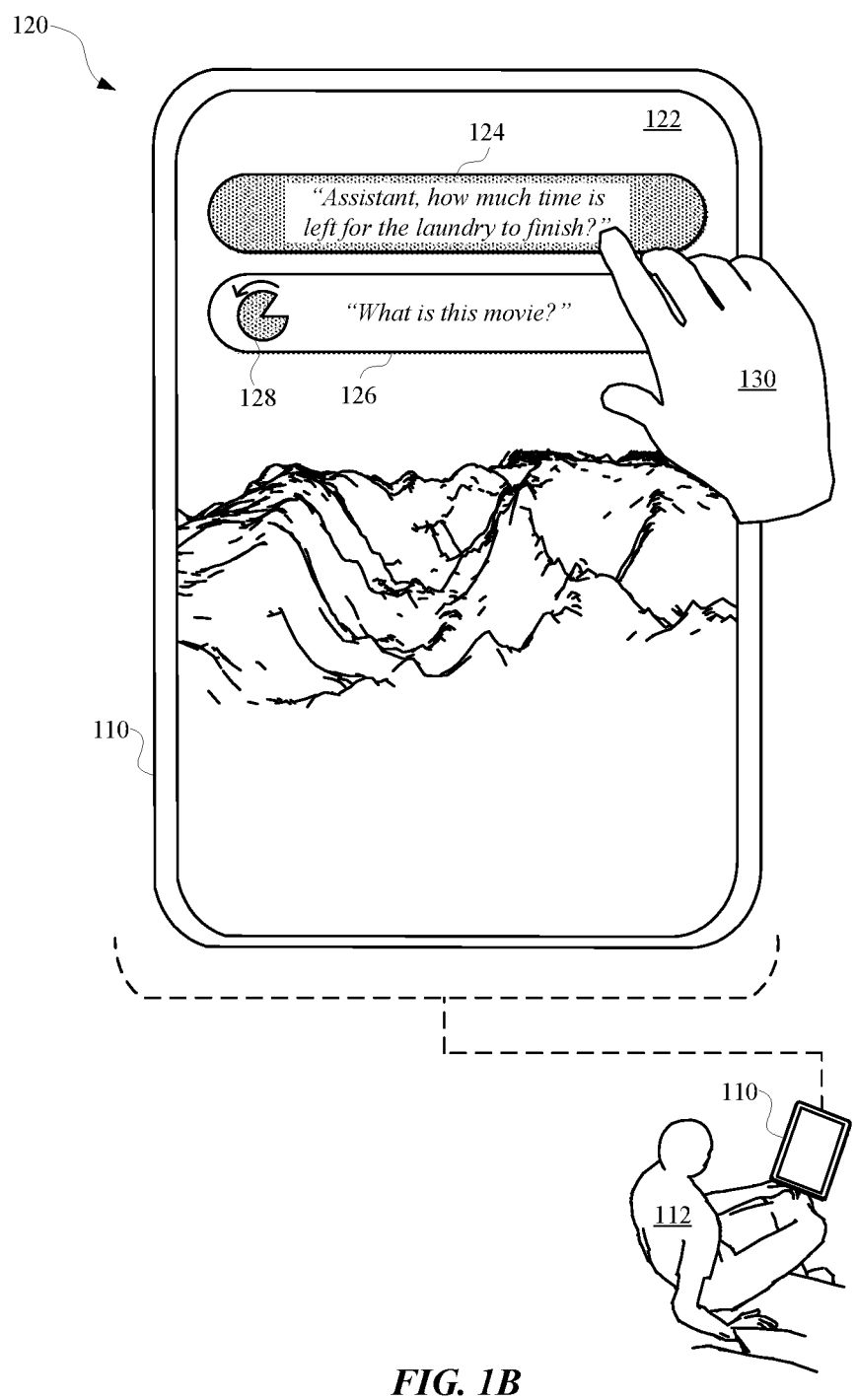
Figure 1C:
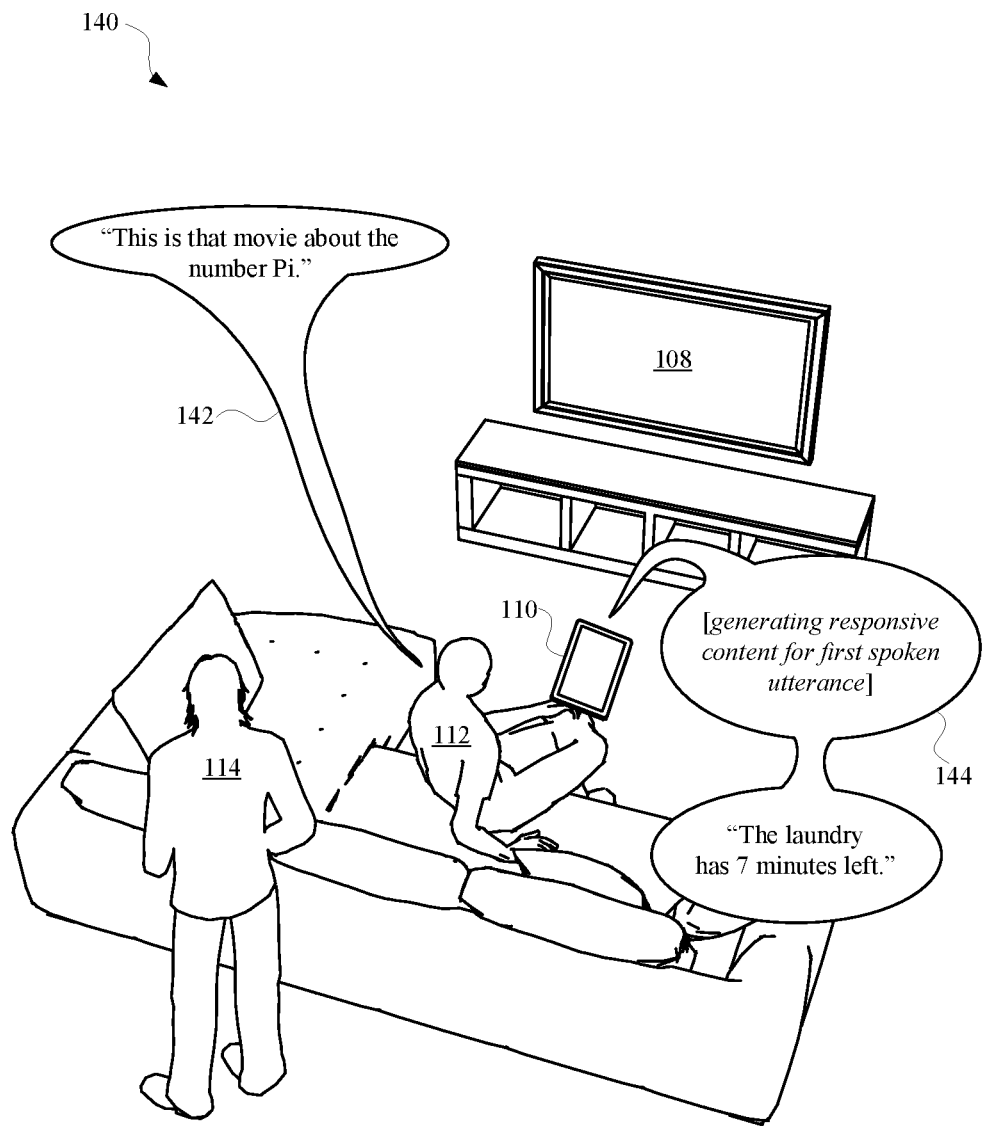

FIG. 1A, FIG. 1B, and FIG. 1C illustrate a view 100, a view 120, and a view 140 of multiple users interacting with an automated assistant, and thereby causing the automated assistant to distinguish between who is invoking the automated assistant. FIG. 1A illustrates a view 100 of a first user 112 providing a first spoken utterance 102 to an automated assistant that is accessible via a computing device 110. The first spoken utterance 102 can be, for example, "Assistant, how much time is left for the laundry to finish?" The second user 114 can provide a second spoken utterance 106 at a time that at least partially overlaps with a time period in which the first user 112 was providing the first spoken utterance 102. This overlap in time can be illustrated by time frame 104, which characterizes the second spoken utterance 106 as being provided during a time when the first user 112 is providing a portion of the first spoken utterance 102 (e.g., the portion "laundry to finish"). Because each spoken utterance can be associated with a request that can be fulfilled by the automated assistant, the automated assistant can acknowledge both spoken utterances. Furthermore, the automated assistant can provide an opportunity for one or both spoken utterances to be selectively fulfilled. In this manner, the ability of the assistant to respond desirably to competing or complementary utterances from separate users can be improved.

The first spoken utterance 102 can be fulfilled at least in part by the automated assistant accessing IoT device data associated with a washing machine located in a home of the first user 112. Furthermore, the second spoken utterance 106 can be fulfilled at least in part by the automated assistant accessing streaming data that is being used by a television 108 that is also connected in the home of the first user 112. The computing device 110 and/or a remote server device, can employ speech processing techniques, such as one or more speaker diarization processes, in order to distinguish between spoken utterances provided by multiple different users. As a result, and as depicted in view 120 of FIG. 1B, the automated assistant can cause content associated with each spoken utterance to be rendered at a graphical user interface 122 of the computing device 110.

In some implementations, when the computing device 110 is being spoken to by multiple different users, a progress of how each spoken utterance is being transcribed can be presented at the graphical user interface 122. For example, natural language content characterizing each spoken utterance can be rendered in real-time as each user is speaking, even before each respective user has finished their respective spoken utterance. Furthermore, in some implementations, each selectable element that includes the natural language content can be selected, in order to direct the automated assistant to process the spoken utterance for one particular user instead of another particular user. For example, when a first user and a second user are speaking simultaneously, the first user can select a selectable element that characterizes their respective spoken utterance in order to cause the computing device 110 to no longer process content of the other spoken utterance that is continuing to be provided by the second user.

In accordance with the example described with respect to FIG. 1A, FIG. 1B illustrates a view 120 of a first selectable element 124 and a second selectable element 126 being rendered at the graphical user interface 122 of the computing device 110. In order to cause the automated assistant to be responsive to the first spoken utterance 102 and not the second spoken utterance 106, the first user 112 can select the first selectable element 124 and not the second selectable element 126. For example, the first user 112 can use their hand 130 in order to select the first selectable element 124, as provided in view 120. The darker shading in the first selectable element 124 can indicate that the first selectable element 124 has been selected. In some implementations, a countdown timer 128 can optionally be rendered in association with the second selectable element 126. The countdown timer 128 can establish an amount of time that a user has before the second selectable element 126 can be selected to cause a request associated with the second selectable element 126 to be fulfilled. When the countdown timer 128 expires, the second selectable element 126 can be omitted from the graphical user interface 122. Alternatively, the countdown timer 128 can indicate an amount of time before the automated assistant will initialize fulfilling a request embodied in the second spoken utterance 106. Therefore, a user will have an amount of time characterized by the countdown timer 128 (e.g., less than a minute, or any other threshold time period) to swipe away the second selectable element 126 or otherwise cause cancellation of further fulfillment of a request associated with the second spoken utterance 106. In some implementations, a threshold amount of time that a user can select the first selectable element 124 and/or the second selectable element 126 can be static or dynamic. In some implementations, the threshold amount of time can change according to a request embodied in the first spoken utterance 102 and/or another request embodied in the second spoken utterance 106.

In some implementations, when the first user 112 selects the first selectable element 124, the automated assistant can initialize performance of one or more actions in furtherance of fulfilling a request embodied in the first spoken utterance 102. For example, as provided in view 140 of FIG. 1C, a status 144 of the automated assistant can include generating responsive content for the first spoken utterance 102, and outputting a response to the first user 112. For example, an output from the automated assistant can include, "The laundry has 7 minutes left." In this way, despite multiple spoken utterances being simultaneously provided to the automated assistant, the automated assistant can distinguish between each spoken utterance provided by each user, and selectively respond to one or multiple spoken utterances. Furthermore, the automated assistant and/or the computing device 110 may not necessarily respond to all inquiries submitted in a context in which multiple users are providing queries that the automated assistant is capable of responding to. Rather than the automated assistant responding to the second user 114, the first user 112 can respond to the second user 114 with another spoken utterance 142 such as, "This is that movie about the number Pi." Allowing the automated assistant to be more responsive in conversational contexts can streamline responses from the automated assistant, thereby reducing lag time in processing inputs, and a total time that a microphone of the computing device 110 will be active. In effect, resources may be deployed towards the most important task or tasks, improving the efficiency of resource allocation and avoiding unnecessary processing. Nevertheless, the disclosed approach avoids unwanted reduction in the flexibility of assistant task performance, which may result from restricting requests to a specific user, for example.

Figure 2A:
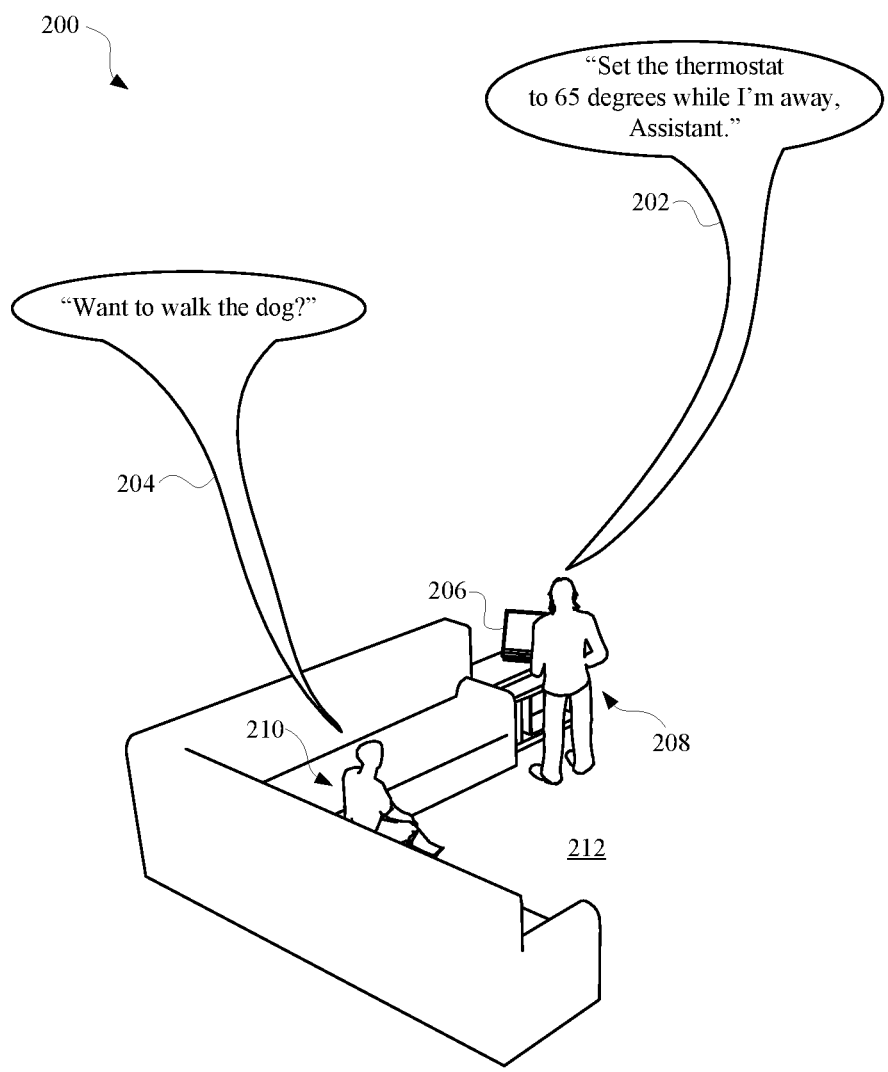
FIG. 2A, FIG. 2B, and FIG. 2C illustrate views of a computing device that selectively distinguishes between simultaneously provided spoken utterances that may or may not be directed to the computing device.
Figure 2B:
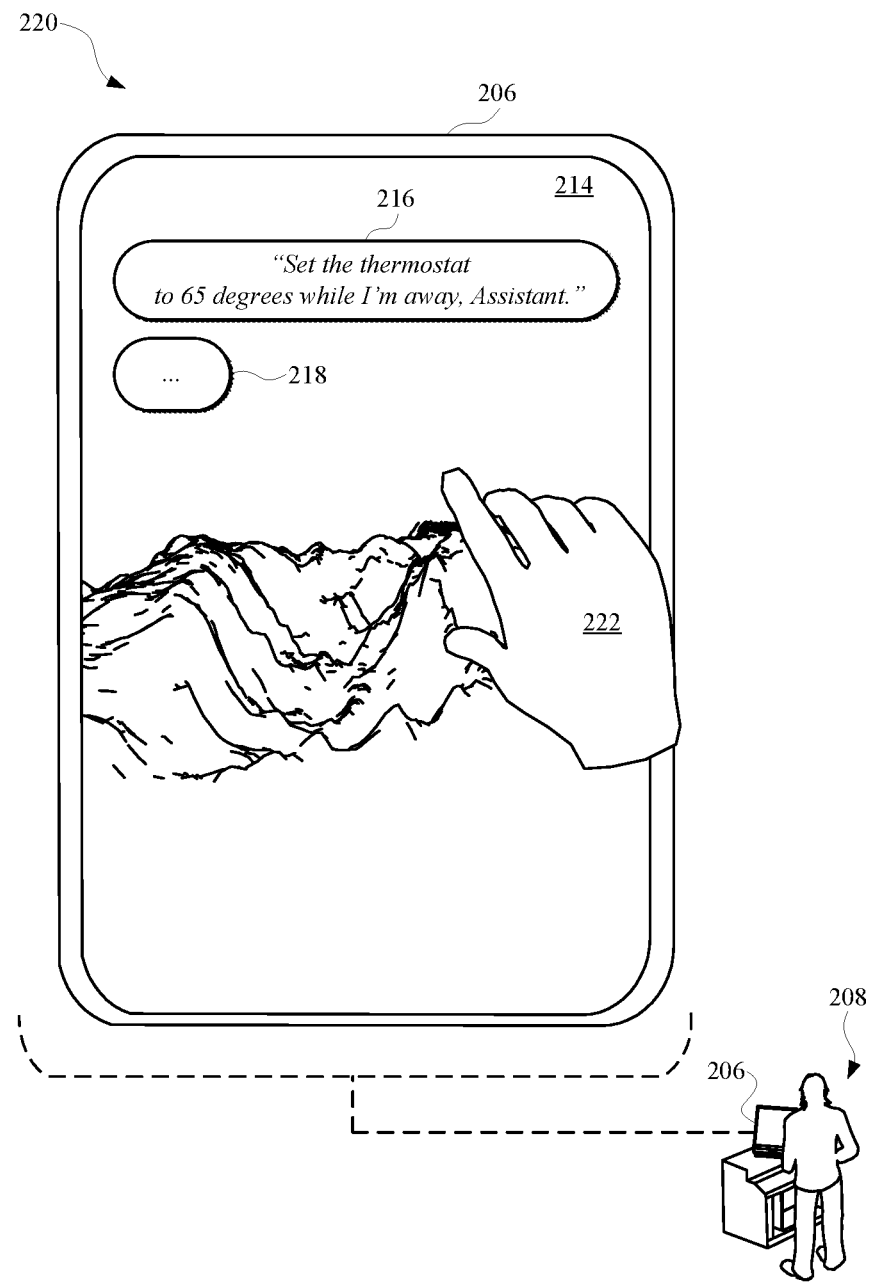
Figure 2C:
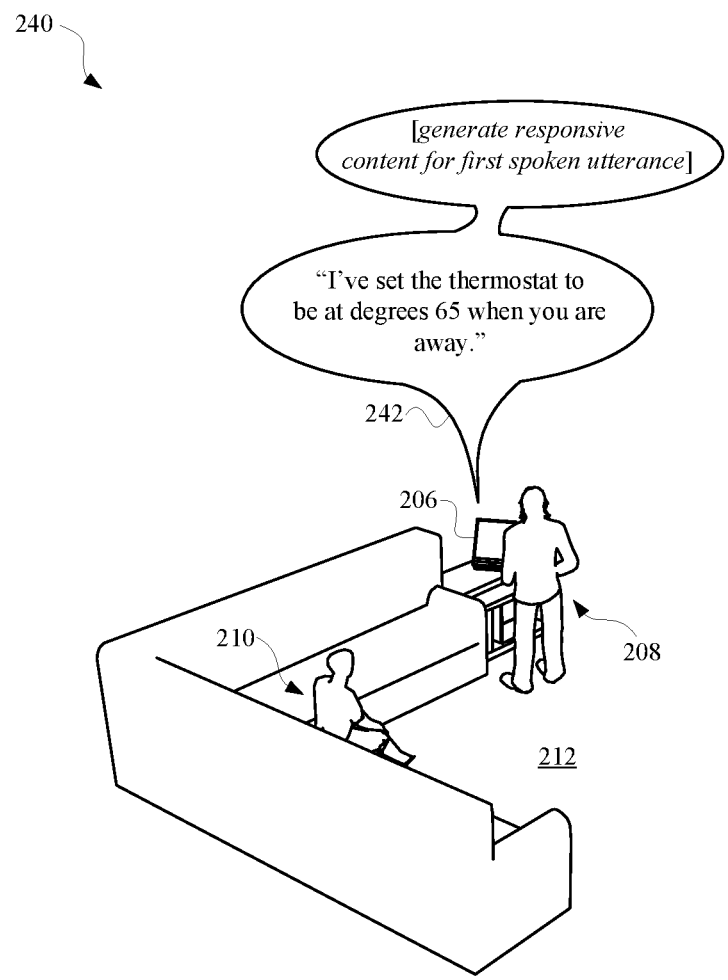

FIG. 2A, FIG. 2B, and FIG. 2C illustrate a view 200, a view 220, and a view 240, respectively, of a computing device 206 that selectively distinguishes between simultaneously provided spoken utterances that may or may not be directed to the computing device 206. FIG. 2A illustrates a view 200 of a first user 208 providing a first spoken utterance 202 such as, "Set the thermostat to 65° while I'm away, Assistant." The computing device 206 can provide access to an automated assistant that is capable of controlling one or more applications and/or devices associated with the computing device 206. For example, the automated assistant can receive spoken utterances and/or other gestures in furtherance of causing the automated assistant to control a thermostat that is operating in a home 212 of the first user 208. While the first user 208 is providing the first spoken utterance 202, a second user 210 can concurrently provide a second spoken utterance 204 such as, "Want to walk the dog?" Although the second spoken utterance 204 can be directed to the first user 208 instead of the automated assistant, the computing device 206—with prior express permission from the users, can process audio data that embodies the second spoken utterance 204 in order to determine whether the second spoken utterance 204 is directed to the automated assistant and/or otherwise includes an actionable request.

FIG. 2B illustrates a view 220 of a graphical user interface 214 of the computing device 206 rendering content that is responsive to the first spoken utterance 202 and the second spoken utterance 204. For example, the computing device 206 can render, in real time, dynamic natural language content characterizing text of one or more spoken utterances, while the spoken utterances are being provided to the computing device 206. In some implementations, the automated assistant can determine whether a spoken utterance is directed at the computing device 206 and/or the automated assistant, and then render content based on this determination. For example, the automated assistant can determine that the first spoken utterance 202 is directed to the automated assistant and, in response, render a first selectable element 216 that embodies content of the first spoken utterance 202. Furthermore, the automated assistant can determine that the second spoken utterance 204 is not directed to the automated assistant, and in response, bypass rendering content that is based on the second spoken utterance 204. Alternatively, or additionally, the automated assistant can cause a second selectable element 218 to be rendered at the graphical user interface 214 in order to acknowledge that the second user 210 is speaking.

In some implementations, the first user 208 can select the first selectable element 216 with their hand 222 or via some other gesture (e.g., gaze, posture, and/or any other bodily motion) in order to cause the automated assistant to initialize performance of one or more actions. The one or more actions can be performed in furtherance of fulfilling a request embodied in the first spoken utterance 202. Alternatively, the first user 208 can select the second selectable element 218 instead of the first selectable element 216 in order to cause the computing device 206 to temporarily bypass processing further spoken utterances from the first user 208 and instead temporarily listen for further spoken utterances from the second user 210. As a result of the first user 208 selecting the second selectable element 218, the automated assistant can bypass performing the one or more actions in furtherance of fulfilling the request embodied in the first spoken utterance 202. Alternatively, if the first user 208 provides no input to the computing device 206 subsequent to providing the first spoken utterance 202, the automated assistant can initialize performance of the one or more actions in furtherance of fulfilling the request embodied in the first spoken utterance 202. Moreover, if the first user 208 provides no input to the computing device 206 subsequent to providing the first spoken utterance 202, the automated assistant can bypass performing any actions in an attempt to fulfill any requests embodied in the second spoken utterance 204.

For example, and as depicted in view 240 of FIG. 2C, in response to a threshold amount of time expiring and the first user 208 providing no further input to the computing device 206, the automated assistant can operate to fulfill the request embodied in the first spoken utterance 202. A status 242 of the automated assistant can indicate that the automated assistant is generating responsive content for the first spoken utterance 202 and cause the automated assistant to provide an output such as, "I've set the thermostat to be at 65 degrees when you are away." In this way, the automated assistant can employ speech diarization in order to acknowledge multiple spoken utterances provided simultaneously but act on a subset of the spoken utterances (e.g., less than all of the spoken utterances). Furthermore, this can allow the automated assistant to preserve computational resources when a user explicitly elects to select a selectable element for one spoken utterance and bypass selecting any other select about elements. This allows the automated assistant to have permission to listen to a subset of multiple users, rather than continuing to listen to all users that are speaking regardless of whether they are directing any requests to the automated assistant.

Figure 3A:
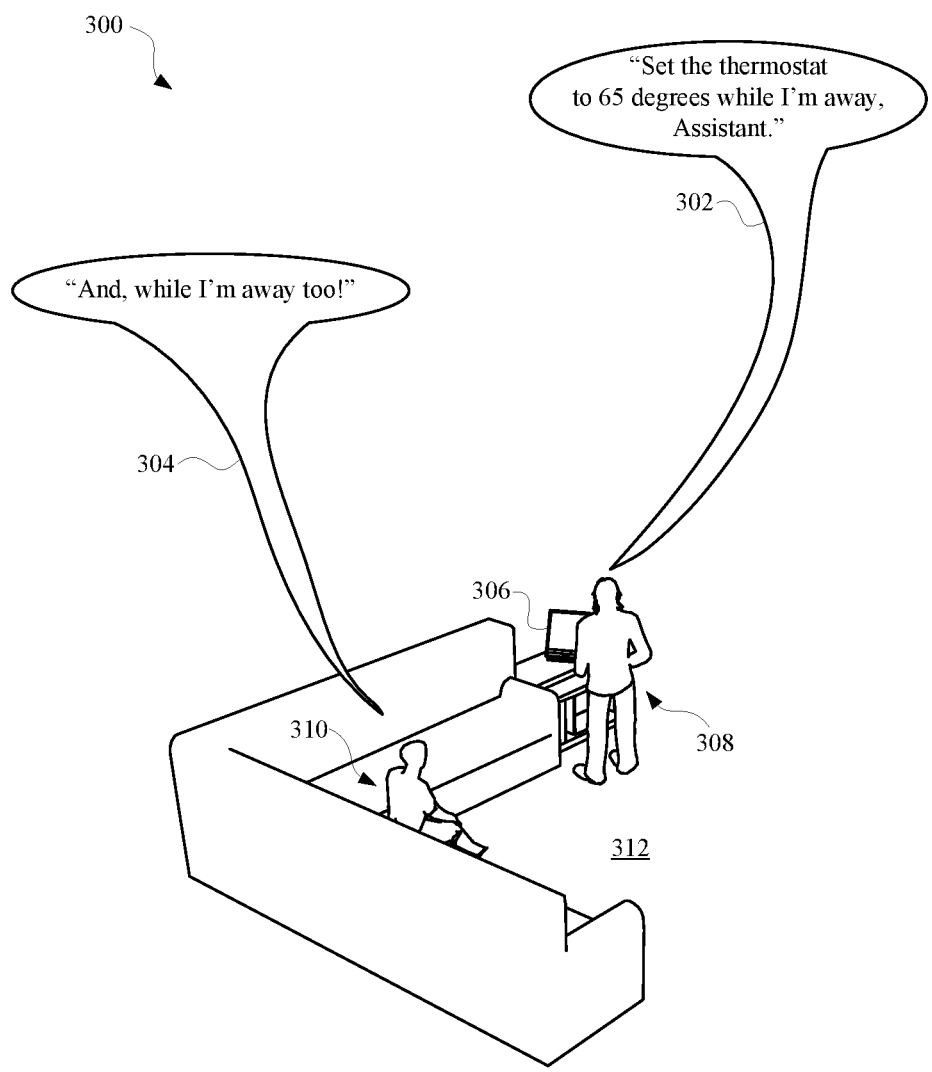
FIG. 3A, FIG. 3B, and FIG. 3C illustrate views of a computing device that allows users to direct an automated assistant to be responsive to one of multiple spoken utterances that have been received by the automated assistant concurrently and/or sequentially.
Figure 3B:
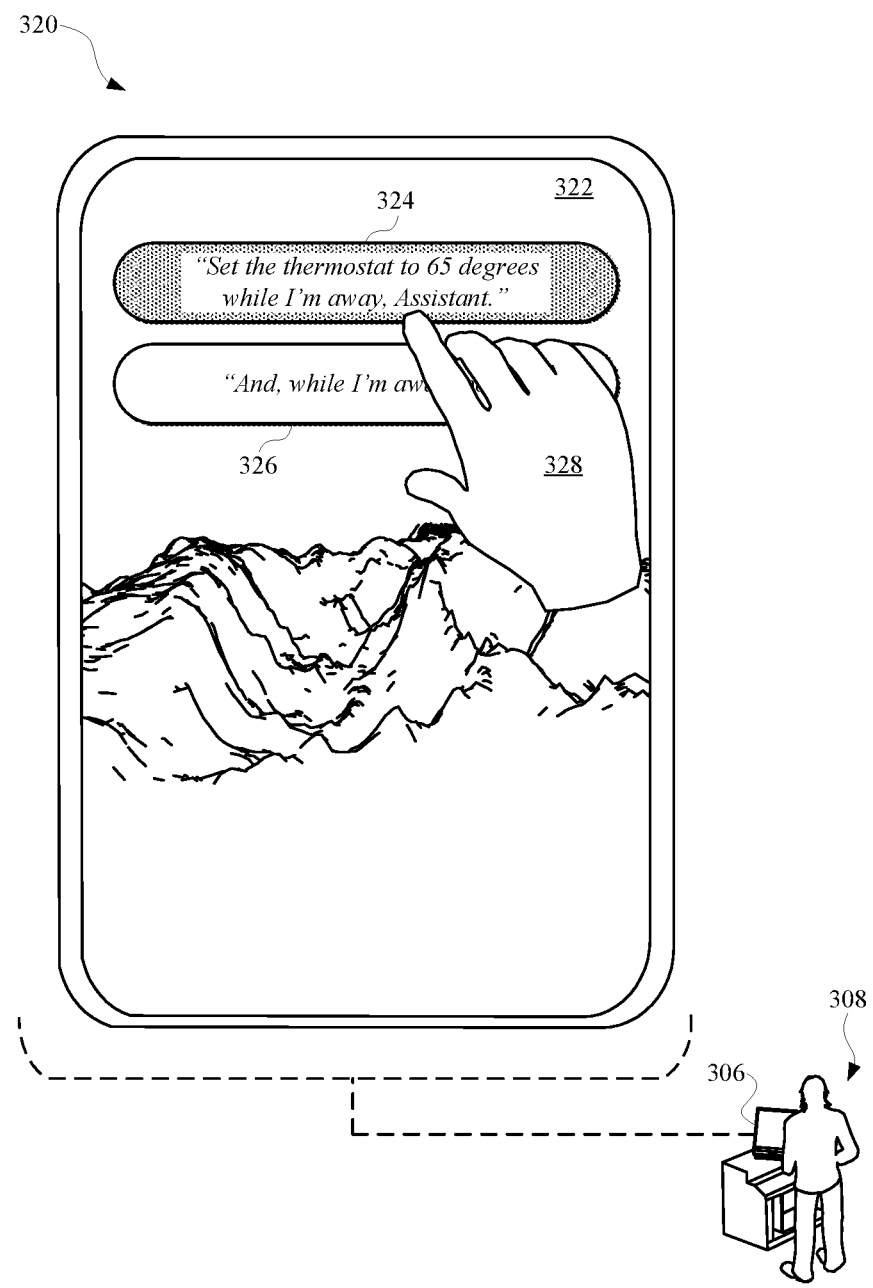
Figure 3C:
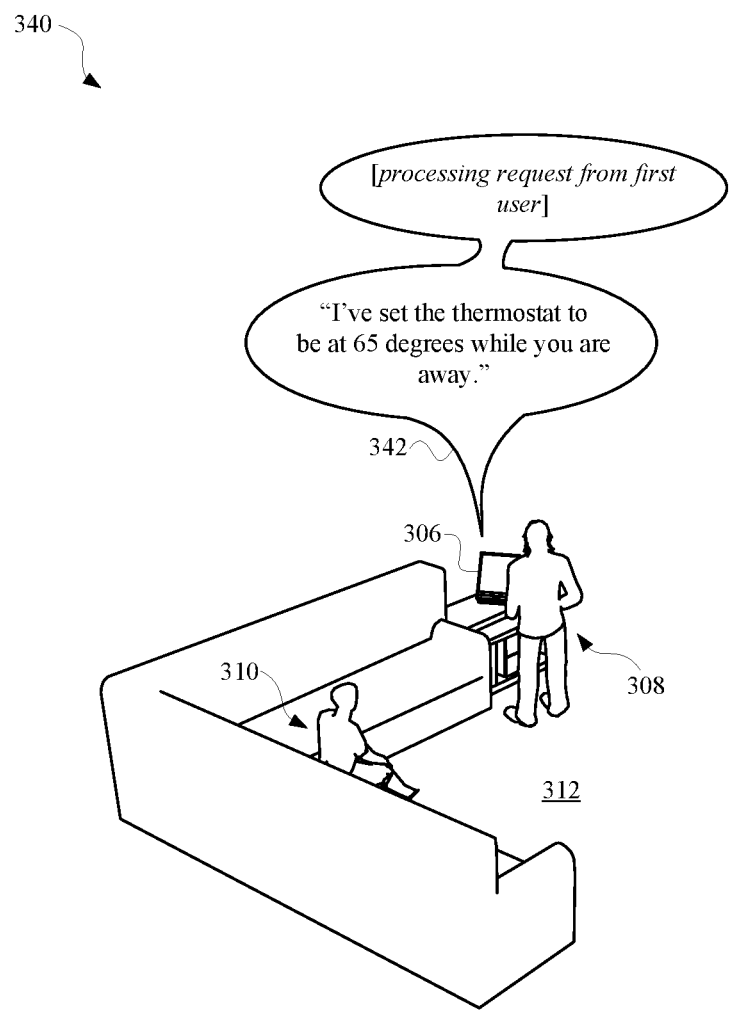

FIG. 3A, FIG. 3B, and FIG. 3C illustrate a view 300, a view 320, and a view 340 of a computing device 306 that allows users to direct an automated assistant to be responsive to one of multiple spoken utterances that have been received by the automated assistant concurrently and/or sequentially. FIG. 3A illustrates a view 300 of a first user 308 providing a first spoken utterance 302 such as, "Set the thermostat to 65 degrees while I'm away, Assistant." Simultaneous to the first user 308 providing the first spoken utterance 302, and/or shortly thereafter, a second user 310 can also provide a spoken utterance. For example, the second user 310 can provide a second spoken utterance 304 such as, "And, while I'm away too!" The second spoken utterance 304, when provided in isolation from the first spoken utterance 302, may not result in any actions being undertaken by an automated assistant, which is accessible via the computing device 306. However, because the second spoken utterance 304 was provided in a similar context to the first spoken utterance 302 (e.g., in the same room, within a threshold period of time, and/or any other indication of context), the automated assistant can cause the computing device 306 to generate responsive content in response to the second spoken utterance 304.

For example, as depicted in view 320 of FIG. 3B, the automated assistant can cause the computing device 306 to render one or more selectable elements that incorporate content that is based on the first spoken utterance 302 and the second spoken utterance 304. In some implementations, the automated assistant can determine that the second spoken utterance 304 provided by the second user 310 identifies a parameter or slot value of an action that is the subject of a request embodied by the first spoken utterance 302. For example, the automated assistant can determine that the first user 308 has requested to modify a schedule of operations of an IoT device within a home 312 of the user. A condition of the modification to the schedule can be a presence of a user who is identified in a parameter of a function that is involved in operating according to the schedule. Therefore, with respect to the first spoken utterance 302, the first user 308 will be the subject of the modification to the schedule of the IoT device. Furthermore, the automated assistant can determine that, based on content of the first spoken utterance 302, the second user 310 is requesting one or more of the same actions requested by the first user 308, except that the second user 310 is requesting the schedule also be modified according to a presence of the second user 310. In other words, the second user 310 is requesting that the same modification be made to the schedule of operations for the IoT device, except that the modification should be conditioned upon the presence of the second user 310.

When the automated assistant has rendered one or more selectable elements at the graphical user interface 322 of the computing device 306, the first user 308 can optionally select a selectable element corresponding to any requests that the first user 308 would like the automated assistant to fulfill. As an example, a first selectable element 324 can be rendered at the graphical user interface 322 to characterize the first spoken utterance 302 provided by the first user 308. Additionally, a second selectable element 326 can also be rendered at the graphical user interface 322 and characterize the second spoken utterance 304 provided by the second user 310. FIG. 3B illustrates an instance when the first user 308 uses their hand 328 to select the first selectable element 324, as indicated by the darker filling of the first selectable element 324 compared to the second selectable element 326. In response to the first user 308 tapping the first selectable element 324, the automated assistant can initialize performance of one or more actions in furtherance of fulfilling a request embodied by the first spoken utterance 302. In some implementations, when any user or an authenticated user does not provide a gesture for selecting the second selectable element 326 within a threshold period of time, the automated assistant can bypass performing one or more other actions in furtherance of fulfilling another request embodied by the second spoken utterance 304.

As provided in view 340 of FIG. 3C, a status 342 of the automated assistant can indicate that the automated assistant has processed a request from the first user in response to the first user 208 selecting the first selectable element 324 at the graphical user interface 322. Furthermore, the status 342 indicates that the automated assistant has not initialized any actions in furtherance of fulfilling the other requests embodied in the second spoken utterance 304. However, if either user desired to have the other requests from the second user 310 fulfilled, either user could tap the second selectable element 326. In response, the automated assistant would process contextual data, natural language content of the first and second spoken utterances, and/or any other data in order to initialize performance of one or more other actions for fulfilling the other request. However, and as provided in view 340 of FIG. 3C, the automated assistant could optionally cease processing in furtherance of fulfilling the other request from the second user 310.

Figure 4A:
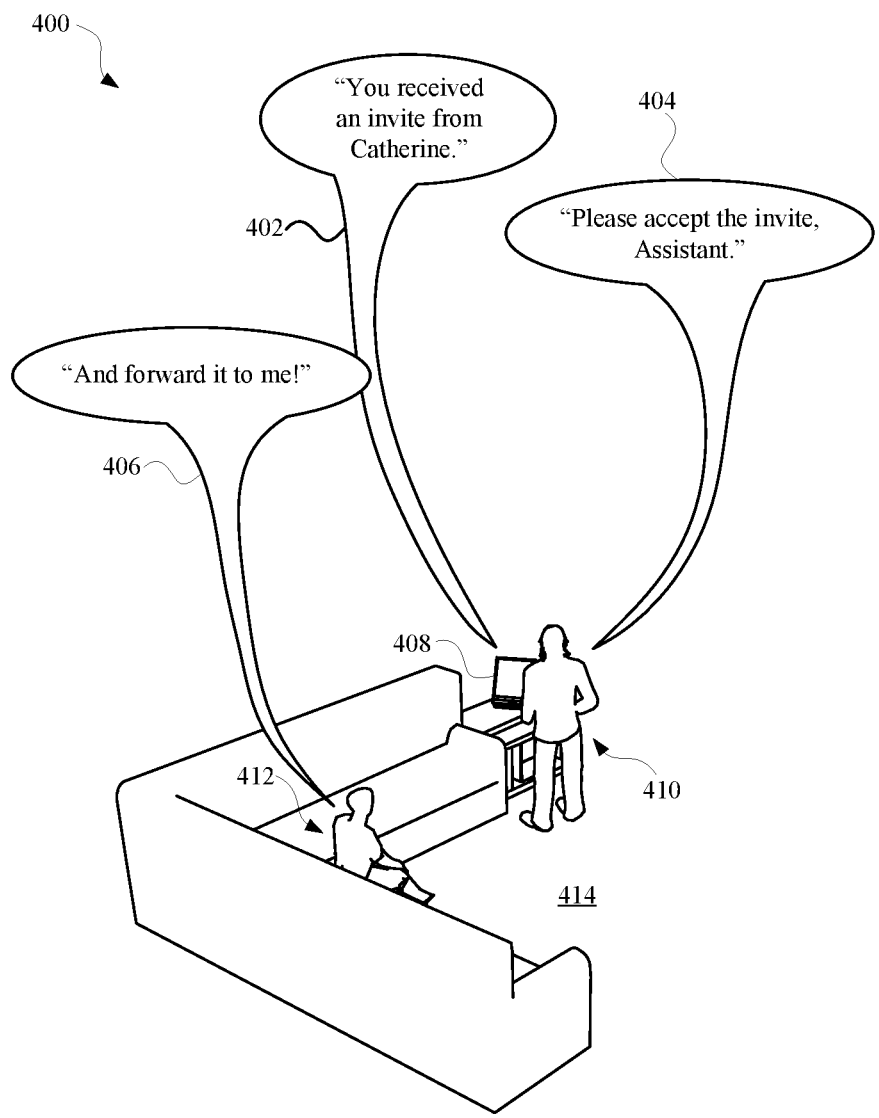
FIG. 4A, FIG. 4B, and FIG. 4C illustrate views of an automated assistant being simultaneously subject to spoken commands from multiple different users and providing responses to each user.
Figure 4B:
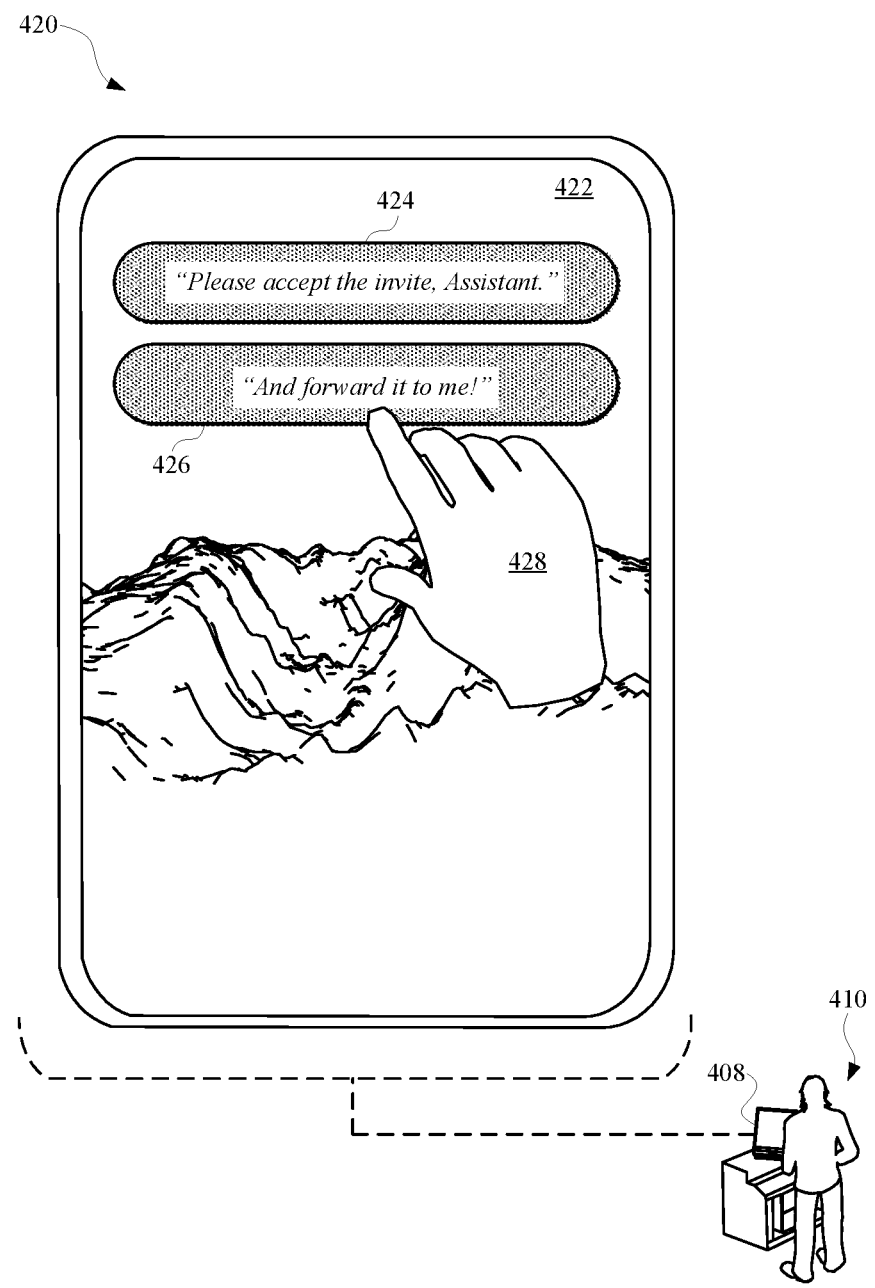
Figure 4C:
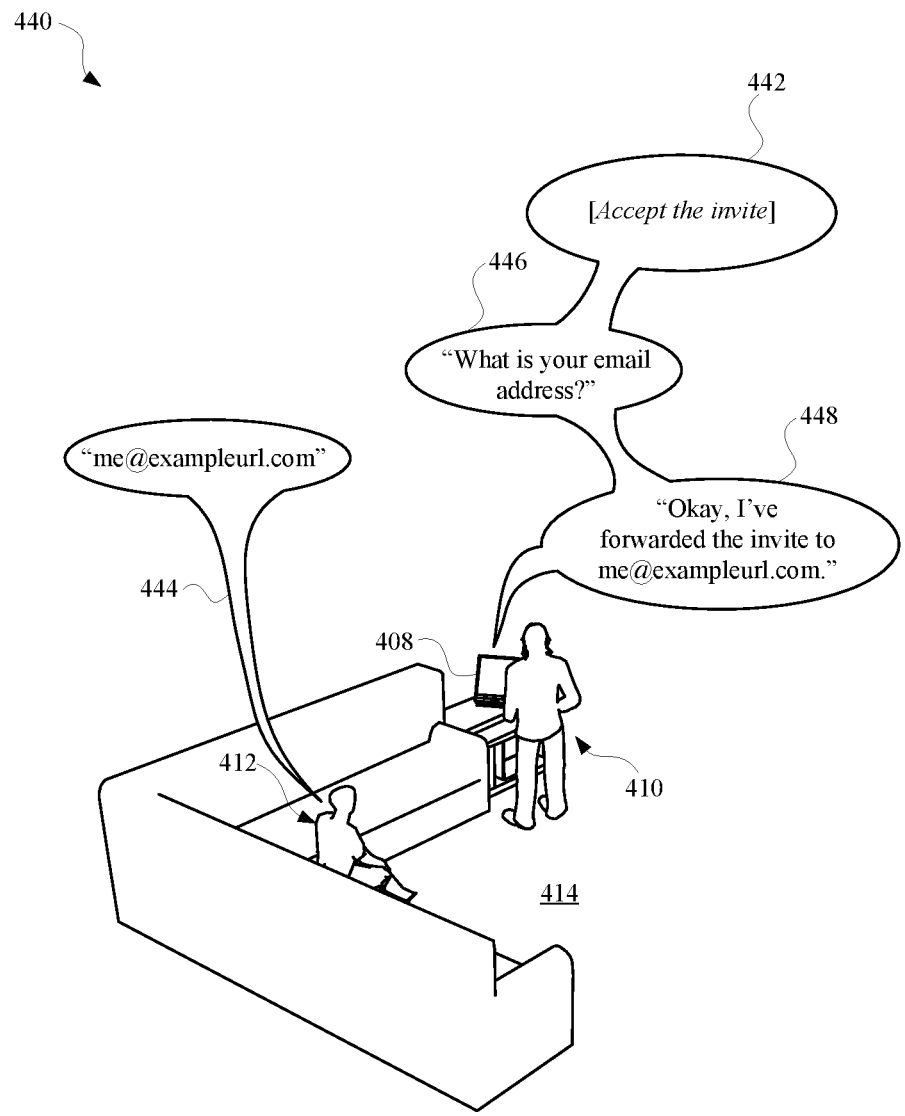

FIG. 4A, FIG. 4B, and FIG. 4C illustrate a view 400, a view 420, and a view 440, respectively, of an automated assistant being simultaneously subject to spoken commands from multiple different users and providing responses to each user. FIG. 4A illustrates a view 400 of an automated assistant providing a notification 402 to a first user 410 via an audio interface of a computing device 408. The notification 402 can be an audible notification such as, "You received an invite from Catherine." The notification 402 can be generated in response to an account of the first user 410 receiving a message from a user named Catherine regarding an upcoming event. In view of the notification 402, the first user 410 can provide a first spoken utterance 404 such as, "Please accept the invite, Assistant." The automated assistant can initialize a microphone of the computing device 408 while outputting the notification 402 and shortly thereafter, in order to determine how the first user 410 would like the automated assistant to handle the notification 402. Therefore, the computing device 408 can generate audio data that captures the first spoken utterance 404.

A second user 412 that is in a home 414 with the first user 410 and the computing device 408 can also provide a spoken utterance in view of the automated assistant rendering the notification 402. For example, the second user 412 can provide a second spoken utterance 406 such as, "And forward it to me!" The computing device 408 can render the audio data to also capture the second spoken utterance 406 from the second user 412. As a result, the audio data may include portions where audio content, characterizing the first spoken utterance 404, overlaps with audio content characterizing the second spoken utterance 406. Regardless, the computing device 408 and/or the automated assistant can employ one or more speaker diarization processes in order to distinguish between variations in vocal properties of the first user 410 and the second user 412, and thus separately respond to each respective user. In some implementations, and as provided in view 420 of FIG. 4B, the automated assistant can cause a graphical user interface 422 of the computing device 408 to render content characterizing spoken utterances provided by multiple different users.

View 420 of FIG. 4B illustrates the graphical user interface 422 having a first selectable element 424 and a second selectable element 426. A user can select one or both selectable elements in order to cause the automated assistant to fulfill a request embodied in the first spoken utterance 404 and a request embodied in the second spoken utterance 406. The first selectable element 424 can include natural language content characterizing at least a portion of speech provided by the first user 410 (e.g., "Please accept the invite, Assistant"), and the second selectable element 426 can also include other natural language content characterizing at least a portion of the other speech provided by the second user 412 (e.g., "And forward it to me!").

In some instances, the first user 410 can use their hand 428 to select both the first selectable element 424 and the second selectable element 426, as indicated by the darker shading occupying portions of the first selectable element 424 and the second selectable element 426 in FIG. 4B. In some implementations, content of the selectable elements can be consolidated into a single selectable element and/or rendered as text that can be selected by one or more gestures. Alternatively, or additionally, one or more properties of the natural language content of the selectable elements can be based on features of the audio data attributed to vocal properties of each user. For example, the first selectable element 424 can include darker, larger, and/or bolder text—at least relative to text of the second selectable element 426, when the first user 410 is determined to be speaking louder than the second user 412.

Subsequent to a user selecting the first selectable element 424 and the second selectable element 426, the automated assistant can perform an operation 442 to accept the invite provided by the user named "Catherine." Additionally, because the second selectable element 426 was selected, the automated assistant can generate responsive content that is based on the second spoken utterance 406. For example, the automated assistant can cause the computing device 408 to render an audible output 446 such as, "What is your email address?" This audible query from the automated assistant can be directed to the second user 412 who can provide a responsive spoken utterance 444 such as, "me@exampleurl.com." The automated assistant and/or the computing device 408 can process additional audio data characterizing the responsive spoken utterance 444. Based on the processing of the additional audio data, the automated assistant can provide another audio output 448 such as, "Okay, I've forwarded the invite to me@exampleurl.com." In this way, the automated assistant will have fulfilled a request embodied in the first spoken utterance 404 from the first user 410 and another request embodied in the second spoken utterance 406 from the second user 412. In some instances, a user may only elect to select the first elected what element 424, thereby causing the automated assistant to accept the received invite without forwarding the invite to the second user 412. Allowing users to have such controls eliminates the need for the automated assistant to process additional spoken utterances that may direct the automated assistant to process spoken utterances that may not embody a request in isolation from other contexts and/or other spoken utterances.

Figure 5:
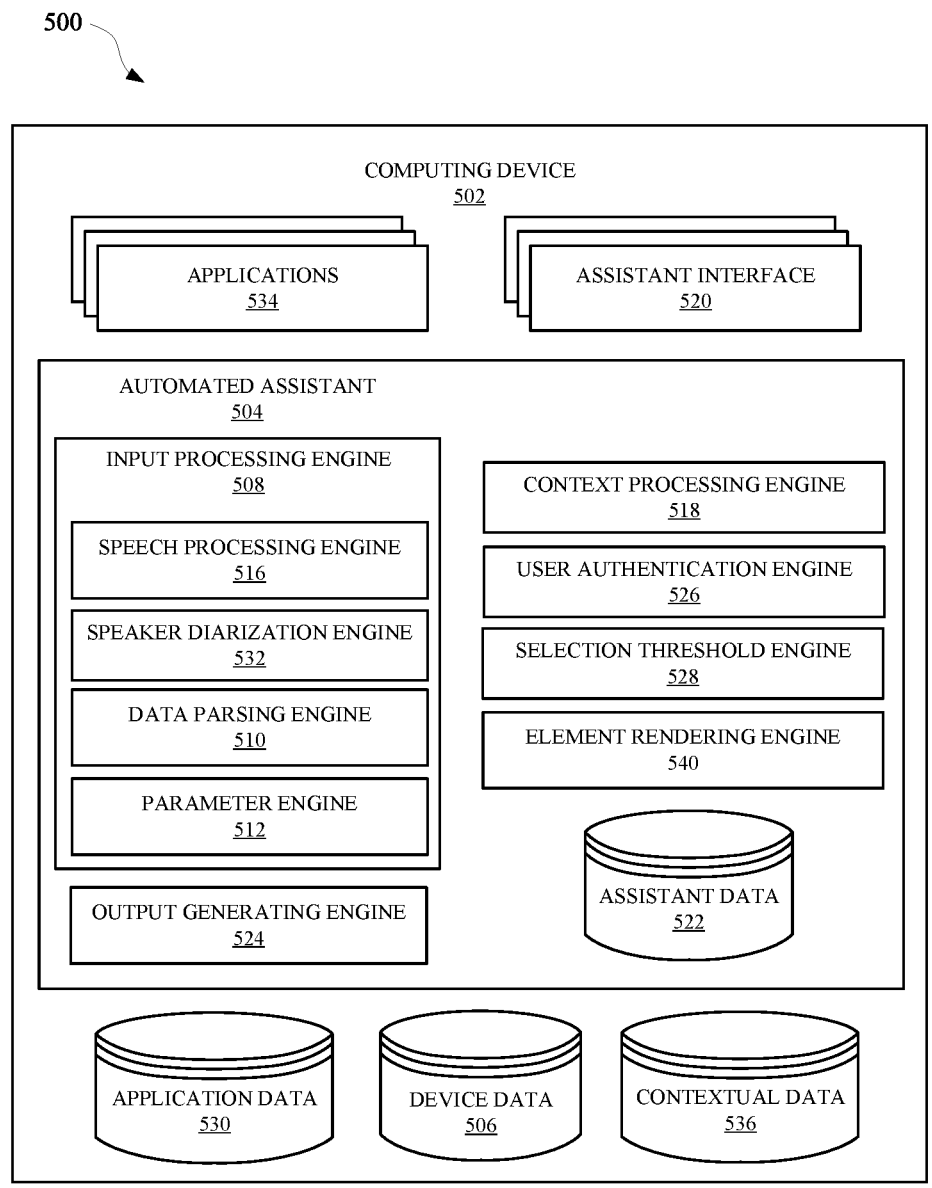
FIG. 5 illustrates a system for providing an automated assistant that can adaptively handle concurrently and/or overlapping spoken utterances provided by multiple different users.

FIG. 5 illustrates a system 500 for providing an automated assistant that can adaptively handle concurrently and/or overlapping spoken utterances provided by multiple different users. The automated assistant 504 can operate as part of an assistant application that is provided at one or more computing devices, such as a computing device 502 and/or a server device. A user can interact with the automated assistant 504 via an assistant interface 520, which can be a microphone, a camera, a touch screen display, a user interface, and/or any other apparatus capable of providing an interface between a user and an application. For instance, a user can initialize the automated assistant 504 by providing a verbal, textual, and/or a graphical input to an assistant interface 520 to cause the automated assistant 504 to perform a function (e.g., provide data, control a peripheral device, access an agent, generate an input and/or an output, etc.).

The computing device 502 can include a display device, which can be a display panel that includes a touch interface for receiving touch inputs and/or gestures for allowing a user to control applications 534 of the computing device 502 via the touch interface. In some implementations, the computing device 502 can lack a display device, thereby providing an audible user interface output, without providing a graphical user interface output. Furthermore, the computing device 502 can provide a user interface, such as a microphone, for receiving spoken natural language inputs from a user. In some implementations, the computing device 502 can include a touch interface and can be void of a camera (or include a camera), but can optionally include one or more other sensors.

The computing device 502 and/or other third party client devices can be in communication with a server device over a network, such as the internet. Additionally, the computing device 502, and any other computing devices, can be in communication with each other over a local area network (LAN), such as a Wi-Fi network. The computing device 502 can offload computational tasks to the server device in order to conserve computational resources at the computing device 502. For instance, the server device can host the automated assistant 504, and/or the computing device 502 can transmit inputs received at one or more assistant interfaces 520 to the server device. However, in some implementations, the automated assistant 504 can be hosted at the computing device 502, and various processes that can be associated with automated assistant operations can be performed at the computing device 502.

In various implementations, all or less than all aspects of the automated assistant 504 can be implemented on the computing device 502. In some of those implementations, aspects of the automated assistant 504 are implemented via the computing device 502 and can interface with a server device, which can implement other aspects of the automated assistant 504. The server device can optionally serve a plurality of users and their associated assistant applications via multiple threads. In implementations where all or less than all aspects of the automated assistant 504 are implemented via computing device 502, the automated assistant 504 can be an application that is separate from an operating system of the computing device 502 (e.g., installed "on top" of the operating system)—or can alternatively be implemented directly by the operating system of the computing device 502 (e.g., considered an application of, but integral with, the operating system).

In some implementations, the automated assistant 504 can include an input processing engine 508, which can employ multiple different modules and/or engines for processing inputs and/or outputs for the computing device 502 and/or a server device. For instance, the input processing engine 508 can include a speech processing engine 516, which can process audio data received at an assistant interface 520 to identify the text embodied in the audio data. The audio data can be transmitted from, for example, the computing device 502 to the server device in order to preserve computational resources at the computing device 502. Additionally, or alternatively, the audio data can be processed at the computing device 502.

The process for converting the audio data to text can include a speech recognition algorithm, which can employ neural networks, and/or statistical models for identifying groups of audio data corresponding to words or phrases. The text converted from the audio data can be parsed by a data parsing engine 510 and made available to the automated assistant 504 as textual data that can be used to generate and/or identify command phrase(s), intent(s), action(s), slot value(s), and/or any other content specified by the user. In some implementations, output data provided by the data parsing engine 510 can be provided to a parameter engine 512 to determine whether the user provided an input that corresponds to a particular intent, action, and/or routine capable of being performed by the automated assistant 504 and/or an application or agent that is capable of being accessed via the automated assistant 504. For example, assistant data 522 can be stored at the server device and/or the computing device 502, and can include data that defines one or more actions capable of being performed by the automated assistant 504, as well as parameters necessary to perform the actions. The assistant data 522 generated via the input processing engine 508 can be processed by an output generating engine 524, in order to cause the automated assistant 504 to provide an output to the user via an assistant interface 520, and/or initialize one or more actions associated with one or more applications 534.

In some implementations, the computing device 502 can include one or more applications 534, which can be provided by third party entities that are different from an entity that provided the computing device 502 and/or the automated assistant 504. An action engine 514 of the automated assistant 504 and/or the computing device 502 can access application data 530 to determine one or more actions capable of being performed by one or more applications 534. Furthermore, the application data 530 and/or any other data (e.g., device data 506) can be accessed by the automated assistant 504 to generate contextual data 536, which can characterize a context in which a particular application 534 is executing at the computing device 502, and/or a context in which a particular user is accessing the automated assistant 504 and/or the computing device 502.

In some implementations, the input processing engine 508 can include a speaker diarization engine 532, which can be employed by the automated assistant 504 in order to distinguish between users that are concurrently speaking. This can provide an ability of the automated assistant 504 to separately respond to each user of multiple users that are speaking concurrently. The speaker diarization engine 532 can be employed by the automated assistant 504 to determine when a first user has provided a spoken utterance concurrent with another spoken utterance provided by a second user that is different from the first user. Furthermore, the speaker diarization engine 532 can be used in combination with the parameter engine 512 to determine whether the first user has provided a request involving one or more actions, and whether the other spoken utterance from the second user embodies one or more parameters that can be used by the automated assistant 504 when performing the one or more actions.

As an example, the first user can provide a first spoken utterance such as "Assistant, make a reservation for two at 7 PM," and the second user can provide a second spoken utterance such as, "At El Caperale." The speaker diarization engine 532 can be employed to distinguish between each spoken utterance provided by each user, even when the users are speaking concurrently for any amount of time. When the automated assistant 504 has separated the spoken utterances and identified content of each spoken utterance, the automated assistant 504 can employ the parameter engine 512 to determine that an action of generating a reservation for a restaurant can require an identifier for a restaurant. Furthermore, the automated assistant 504 can determine that the first user has not identified a restaurant but the second user has identified a restaurant. As a result, the automated assistant can perform the action requested by the first user using one or more parameters identified in the second spoken utterance provided by the second user.

In some implementations, authentication and/or permission(s) established for the second user can determine whether the second user can affect a request submitted by the first user. For example, in some implementations, when the first user has an account that is accessible via the automated assistant 504 but the second user does not have an account that is accessible via the automated assistant 504, the second user would not have permission to affect the request from the first user. Additionally, or alternatively, when each of the first user and the second user are guest users, or are both authenticated users (e.g., both users are recognized as having accounts with the automated assistant 504), each user can affect requests from the other user. Additionally, or alternatively, either user whose request is being affected by another user can provide a gesture to indicate to the automated assistant 504 that the user does not want their request to be affected by the other user, thereby ultimately causing their request to not be affected by the other user.

In some implementations, the automated assistant 504 and/or the computing device 502 can include a user authentication engine 526 for determining whether a user providing a spoken utterance is associated with an account accessible via the automated assistant 504. Additionally, or alternatively, the user authentication engine 526 can determine whether a person providing a spoken utterance is recognized as a user that has previously provided a spoken utterance to the automated assistant 504 and/or has provided permission to the automated assistant 504 to be recognized as a particular unique user.

When multiple users have provided spoken utterances to the automated assistant 504, a selection threshold engine 528 can be employed to determine an amount of time that a user can select one or more selectable elements at a graphical user interface being rendered at the computing device 502. Depending on who provided each spoken utterance, the automated assistant 504 can render selectable elements that can be selected by a user for causing a corresponding request to be fulfilled. An amount of time that a user is able to select a selectable element to initialize performance of one or more actions for fulfilling the request can be determined by the selection threshold engine 528. For instance, contextual data can be processed by a context processing engine 518 in order to provide an indication a context in which the users provided the spoken utterance. Based on this context, and/or any other features associated with the spoken utterances, the selection threshold engine 528 can determine a static or dynamic threshold for selecting each particular selectable element. For instance, a threshold amount of time that a selectable element is rendered can be dependent upon a number of users that have provided a spoken utterance within a period of time. Additionally, or alternatively, a threshold amount of time selected for a particular selectable element can be based on the user who is predicted to be interacting with the selectable element.

In some implementations, the automated assistant 504 and/or the computing device 502 can include an element rendering engine 540 for determining how a GUI element will be rendered in response to a user directing a spoken utterance to the automated assistant 504. For example, the user authentication engine 526 can communicate with the element rendering engine 540 in order to cause the element rendering engine 540 to render a selectable element based on whether the user is authenticated. When the user is not authenticated or otherwise not recognized, the element rendering engine 540 can render a selectable element that does not include natural language content of the spoken utterance from the non-authenticated user. Rather, a selectable element can be rendered for selection by a user in order to cause the automated assistant 504 to fulfill a request submitted by the non-authenticated user. In some implementations, when multiple users provide spoken utterances and the multiple users are authenticated, multiple selectable elements can be rendered with natural language content that is based on the multiple spoken utterances. In some implementations, the computing device 502 and/or the automated assistant 504 may not process a spoken utterance until a user is authenticated and/or a selectable element associated with the spoken utterance has been selected. This can preserve computational resources that may otherwise be employed to process a spoken utterance that may not be directed to the automated assistant—despite being provided concurrently with another spoken utterance.

Figure 6:
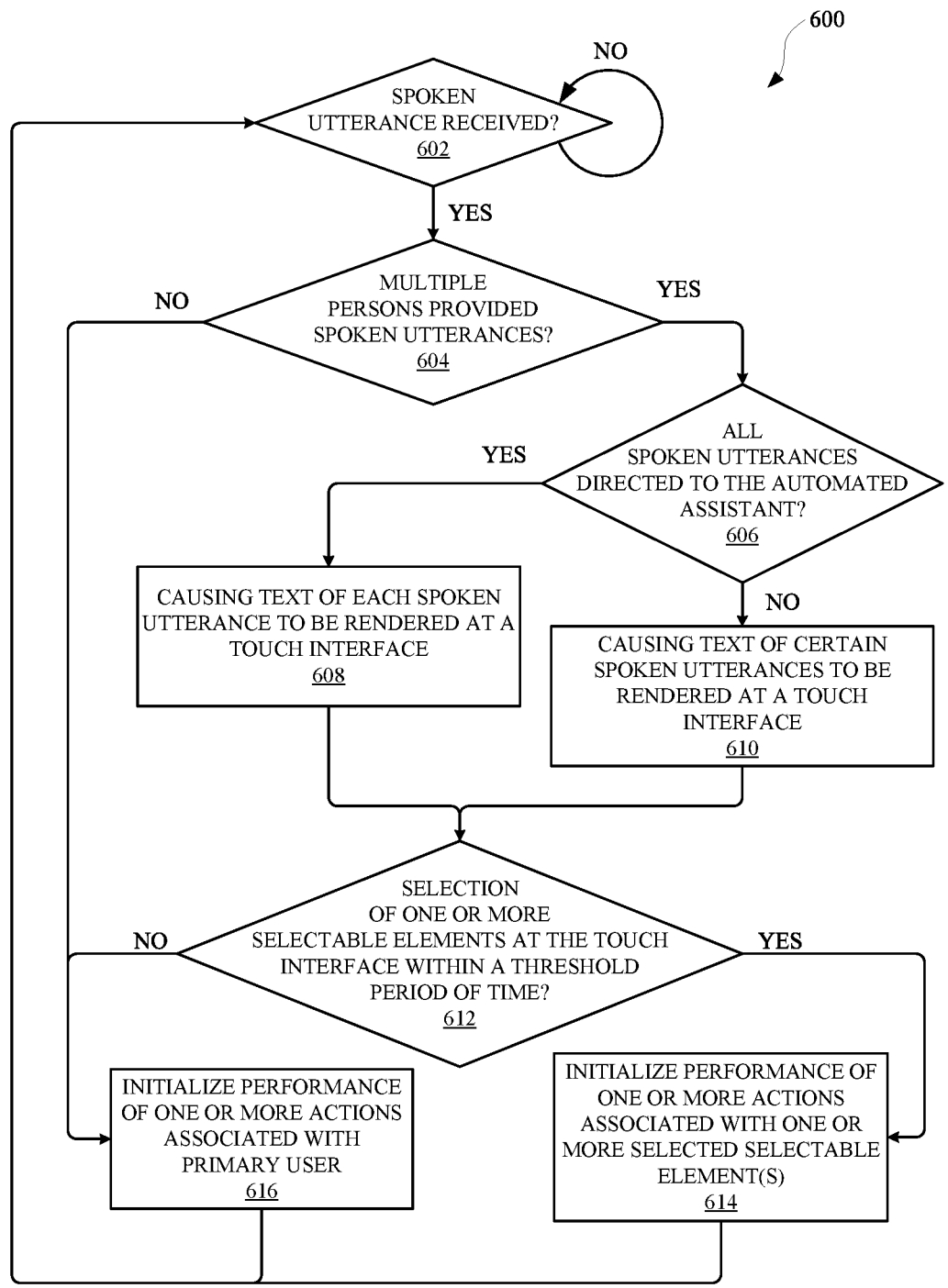
FIG. 6 illustrates a method for operating an automated assistant that can adaptively handle concurrently and/or overlapping spoken utterances provided by multiple different users.

FIG. 6 illustrates a method 600 for operating an automated assistant that can adaptively handle concurrently and/or overlapping spoken utterances provided by multiple different users. The method 600 can be performed by one or more computing devices, applications, and/or any other apparatus or module that can be associated with an automated assistant. The method 600 can include an operation 602 of determining whether a spoken utterance was received at an automated assistant interface of a computing device. When a spoken utterance is determined to have been received by the automated assistant, the method 600 can proceed from the operation 602 to an operation 604. However, when a spoken utterance is determined to have not been received by the automated assistant, the automated assistant can continue to determine whether a spoken utterance has been received.

The operation 604 can include determine whether multiple persons provided spoken utterances, either sequentially within a particular period of time and/or concurrently. Particularly, the automated assistant can determine, using one or more speaker diarization techniques, whether spoken utterances from multiple users are captured in audio data generated by a computing device that provides access to the automated assistant. When the automated assistant has determined that spoken utterances from multiple persons are captured in the audio data, the method 600 can proceed from the operation 604 to an operation 606. However, when the audio data captures a spoken utterance from a single user, the method 600 can proceed from the operation 604 to an operation 616, which can include causing the automated assistant to initialize performance of one or more actions in furtherance of fulfilling one or more requests embodied in the spoken utterance provided by a primary user (e.g., the single user that provided the spoken utterance).

The operation 606 can include determining whether all spoken utterances captured in the audio data are directed to the automated assistant. In some implementations, the automated assistant can determine whether one or more automated assistant actions are associated with a particular spoken utterance and then determine whether any of the other spoken utterances are relevant to the one or more actions. Additionally, or alternatively, the automated assistant can determine whether a spoken utterance from a first user identifies a request that is capable of being fulfilled by the automated assistant and whether a presence of a second user (e.g., characterized by contextual data) indicates that the second user may be the intended recipient of the spoken utterance. Additionally, or alternatively, the automated assistant can determine whether a first spoken utterance identifies a request and whether a second spoken utterance of the spoken utterances identifies a parameters that can be used when operating to fulfill the request. When such processes result in a determination that multiple spoken utterances are directed to the automated assistant, the method 600 can proceed from the operation 606 to an operation 608. However, when a determination that less then all spoken utterances are directed to the automated assistant, the method 600 can proceed from the operation 606 to an operation 610.

The operation 610 can include causing text of certain spoken utterances to be rendered at a touch interface of a computing device that provides access to the automated assistant. The operation 608 can include causing text of all spoken utterances captured by the audio data to be rendered at the touch interface of the computing device. When one or more respective spoken utterances are rendered in selectable elements at the touch interface of the computing device, the method 600 can proceed to an operation 612. The operation 612 can include determining whether a selection of one or more selectable elements at the touch interface were provided within a threshold period of time. When no selection is made within the threshold period of time, the method 600 can proceed to an operation 616 in which the automated assistant can initialize performance of one or more actions associated with the primary user.

In some implementations, the primary user can be someone that was interacting with the automated assistant and/or the computing device immediately before the primary user provided the spoken utterance. In some implementations, the primary user can be someone whose spoken utterance matches a voice profile that is accessible via the computing device as a primary voice profile for the computing device. In some implementations, a determination of who is a primary user can be based on based on vision data from one or more vision sensors of the computing device. For example, a user can be designated as a primary user by the automated assistant and/or the computing device when the user is a most proximal user, of at least the user and another person, relative to the computing device, and the user is determined to be the one who provided a particular spoken utterance. When a selection is made within the threshold period of time, the method 600 can proceed from the operation 612 to an operation 614. The operation 614 can include initializing performance of one or more actions associated with the one or more selected selectable elements.

Figure 7:
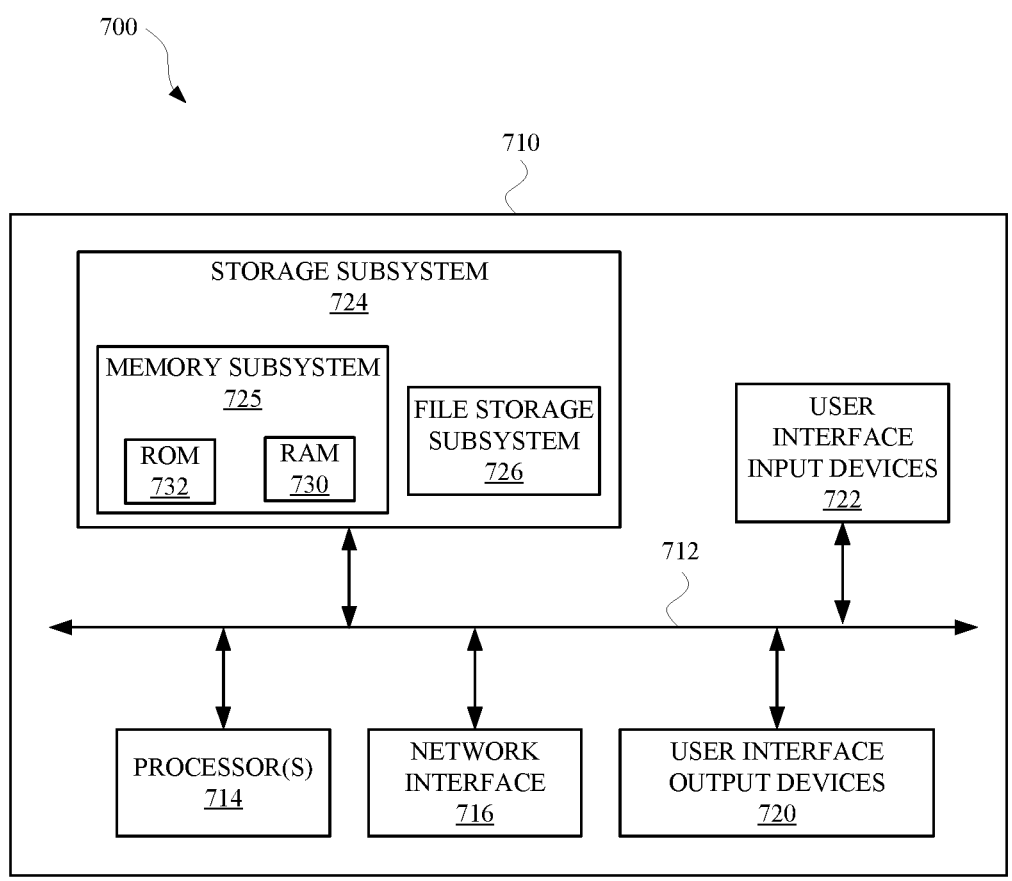
FIG. 7 is a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 600, and/or to implement one or more of system 500, computing device 110, television 108, computing device 206, computing device 306, computing device 408, and/or any other application, device, apparatus, and/or module discussed herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as an example for purposes of illustrating some implementations. Many other configurations of computer system 710 are possible having more or fewer components than the computer system depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as processing, at a computing device, audio data that captures a first spoken utterance, spoken by a first user, and a second spoken utterance, spoken by a second user, wherein at least a portion of the first spoken utterance overlaps with at least a portion of the second spoken utterance in the audio data. The method can further include an operation of determining, based on processing the audio data, that the first spoken utterance provided by the first user embodies a request that is directed to an automated assistant that is accessible via the computing device. The method can further include an operation of causing, based on determining that the first spoken utterance embodies the request directed to the automated assistant, an interactive element to be rendered at a graphical user interface of the computing device, wherein the interactive element includes natural language content that characterizes the request embodied by the first spoken utterance. The method can further include an operation of determining, based on processing the audio data, whether the second spoken utterance embodies an additional request that is directed to the automated assistant. The method can further include an operation of, when the second spoken utterance is determined to embody the additional request directed to the automated assistant: causing an additional interactive element to be rendered at the graphical user interface of the computing device, wherein the interactive element includes additional natural language content that characterizes the additional request embodied by the second spoken utterance.

In some implementations, causing the interactive element to be rendered at the graphical user interface of the computing device is performed responsive to determining that the request is directed to the automated assistant by the first user. In some implementations, the method can further include an operation of, when the second spoken utterance is determined to not embody the additional request directed to the automated assistant: bypassing causing the additional interactive element to be rendered at the graphical user interface of the computing device. In some implementations, the method can further include an operation of, when the second spoken utterance is determined to embody the additional request directed to the automated assistant, and while the interactive element and the additional interactive element are rendered at the graphical user interface: causing the automated assistant to initialize performance of one or more actions in furtherance of fulfilling the request embodied in the first spoken utterance, determining whether the additional interactive element has been selected at the graphical user interface within a threshold period of time. In some implementations, the method can further include an operation of, when the additional interactive element has been selected within the threshold period of time: causing the automated assistant to initialize one or more other actions in furtherance of fulfilling the additional request embodied in the second spoken utterance.

In some implementations, the method can further include an operation of, when the second spoken utterance is determined to embody the additional request directed to the automated assistant, and while the interactive element and the additional interactive element are rendered at the graphical user interface: causing the automated assistant to initialize performance of one or more actions in furtherance of fulfilling the request embodied in the first spoken utterance, determining whether the additional interactive element has been selected at the graphical user interface within a threshold period of time, and, when the additional interactive element has not been selected within the threshold period of time: bypassing causing the automated assistant to initialize one or more other actions in furtherance of fulfilling the additional request embodied in the second spoken utterance.

In some implementations, the method can further include an operation of receiving a selection of the interactive element; responsive to receiving the selection: causing the automated assistant to initialize one or more other actions in furtherance of fulfilling the request, and bypassing causing the automated assistant to initialize one or more other actions in furtherance of fulfilling the additional request. In some implementations, the method can further include an operation of receiving a selection of the additional interactive element; and responsive to receiving the selection: causing the automated assistant to initialize one or more other actions in furtherance of fulfilling the additional request, and bypassing causing the automated assistant to initialize one or more other actions in furtherance of fulfilling the additional request. In some implementations, the method can further include an operation of determining that the first user is a primary user relative to the second user; and, in response to determining that the first user is the primary user relative to the second user: causing the interactive element to be rendered more prominently than the additional interactive element.

In some implementations, causing the interactive element to be rendered more prominently than the additional interactive element includes: causing the interactive element to be rendered above the additional interactive element and/or larger than the additional interactive element. In some implementations, the method can further include an operation of determining that first user is a primary user relative to the second user; and, in response to determining that the first user is the primary user and in response to not receiving any selection of the interactive element or the additional interactive element within a threshold amount of time: causing the automated assistant to initialize one or more other actions in furtherance of fulfilling the request, and bypassing causing the automated assistant to initialize one or more other actions in furtherance of fulfilling the additional request.

In some implementations, determining that the first user is the primary user includes: determining that the first spoken utterance matches a voice profile that is accessible via the computing device as a primary voice profile for the computing device. In some implementations, determining that the first user is the primary user includes: determining that the first spoken utterance matches a voice profile determined to match a prior spoken utterance, wherein the prior spoken utterance received is received prior to the first spoken utterance and the second spoken utterance. In some implementations, determining that the first user is the primary user includes: determining, based on vision data from one or more vision sensors of the computing device, that the first user is a most proximal user, of at least the first user and the second user, relative to the computing device, and determining that the first spoken utterance is from the first user.

In other implementations, a method implemented by one or more processors is set forth as including operations such as processing, at a computing device that provides access to an automated assistant, audio data that captures a first spoken utterance, spoken by a first user, and a second spoken utterance, spoken by a second user. The method can further include an operation of determining, based on processing the audio data, that the second spoken utterance provided by the second user is associated with a request, wherein the second spoken utterance, if provided in isolation prior to the first user providing the first spoken utterance, would not cause the automated assistant to initialize fulfillment of the request. The method can further include an operation of causing, based on processing the audio data, a display interface of the computing device to render a first selectable element and a second selectable element, wherein the first selectable element includes content that is based on the first spoken utterance and the second selectable element includes other content that is based on the second spoken utterance.

In some implementations, the method can further include an operation of causing the automated assistant to initialize performance of one or more actions, in furtherance of fulfilling the request and in response to receiving a selection of the second selectable element at the display interface of the computing device. The method can further include an operation of accessing, based on the second spoken utterance provided by the second user, contextual data that characterizes a context in which the second user provided the second spoken utterance, wherein causing a display panel of the computing device to render the second selectable element is based on the contextual data. The method can further include an operation of causing, when the display panel is rendering the first selectable element and the second selectable element, the automated assistant to initialize fulfillment of a particular request embodied in the first spoken utterance provided by the first user, wherein the contextual data identifies a gesture input provided by the first user to the display interface of the computing device, and wherein causing the automated assistant to initialize fulfillment of the particular request is based on the gesture input provided by the first user.

In some implementations, the method can further include an operation of causing, based on processing the audio data, the display interface of the computing device to render the first selectable element and the second selectable element, wherein the first selectable element identifies natural language content of the first spoken utterance from the first user and the second selectable element identifies other natural language content of the second spoken utterance from the second user. In some implementations, the first spoken utterance from the first user embodies a particular request set forth to control a particular application or a particular device, and the request associated with the second spoken utterance is also set forth to control the particular application or the particular device.

In yet other implementations, a method implemented by one or more processors is set forth as including operations such as processing, at a computing device that provides access to an automated assistant, audio data that characterizes a first spoken utterance provided by a first user and a second spoken utterance provided by a second user, wherein a portion of the audio data, which characterizes the first user actively speaking the first spoken utterance, also characterizes the second user concurrently speaking the second spoken utterance. The method can further include an operation of determining, based on processing the audio data, that the first spoken utterance from the first user includes a request to cause the automated assistant to perform one or more actions. The method can further include an operation of determining, based on processing the audio data, whether one or more parameters for performing the one or more actions have been identified by the first user via the first spoken utterance. The method can further include an operation of, when the one or more parameters are determined to have not been identified by the first user: determining whether the second spoken utterance provided by the second user identifies the one or more parameters. The method can further include an operation of, when the second spoken utterance is determined to identify the one or more parameters: initializing performance of the one or more actions by the automated assistant using at least the one or more parameters identified by the second user.

In some implementations, the method can further include an operation of, when the one or more parameters are determined to have not been identified by the first user: determining whether the second spoken utterance provided by the second user is associated with a separate request for the automated assistant to perform one or more other actions. In some implementations, determining whether the second spoken utterance provided by the second user includes the separate request includes: accessing contextual data that characterizes one or more features of a context in which the first spoken utterance was provided by the first user. In some implementations, the method can further include an operation of, when the one or more parameters are determined to have not been identified by the first user and when the separate spoken utterance provided by the second user is determined to be associated with the separate request: causing the automated assistant to initialize performance of the one or more other actions based on the contextual data.

In some implementations, the method can further include an operation of, when the one or more parameters are determined to have not been identified by the first user: determining whether user profile data accessible via the computing device indicates that the one or more actions are modifiable by the second user when the first user has requested performance of the one or more actions. In some implementations, the method can further include an operation of, when the one or more parameters are determined to have not been identified by the first user and when the user profile does not indicate that the one or more actions are modifiable by the second user: providing, via an automated assistant interface of the computing device, an automated assistant output that solicits the first user to provide the one or more parameters.

In some implementations, initializing performance of the one or more actions by the automated assistant using the one or more parameters identified by the second user is performed when the user profile indicates that the one or more actions are modifiable by the second user. In some implementations, the method can further include an operation of causing, based on processing the audio data, a first textual rendering of the spoken utterance to be rendered at a graphical user interface of the computing device and a second textual rendering of the second spoken utterance to be separately and simultaneously rendered at the graphical user interface. In some implementations, the first textual rendering is rendered at a first selectable element of the graphical user interface and the second textual rendering is rendered at a second selectable element of the graphical user interface.

In yet other implementations, a method implemented by one or more processors, the method comprising: processing, at a computing device that provides access to an automated assistant, audio data that captures a first spoken utterance, spoken by a first user, and a second spoken utterance, spoken by a second user. The method can further include an operation of causing, based on processing the audio data, a display interface of the computing device to separately render a first selectable element and a second selectable element, wherein the first selectable element includes content that is based on the first spoken utterance and the second selectable element includes other content that is based on the second spoken utterance.

In some implementations, the method can further include an operation of determining whether a selection of the first selectable element or the second selectable element has been received at the computing device, and, when one or more selections of the first selectable element and the second selectable element has been received at the computing device: causing the automated assistant to perform one or more actions in furtherance of fulfilling one or more requests associated with the first spoken utterance and the second spoken utterance. The method can further include an operation of determining whether a selection of the first selectable element or the second selectable element has been received at the computing device, and, when a particular selection of the first selectable element has been received at the computing device: causing the automated assistant to perform one or more other actions in furtherance of fulfilling one or more requests associated with the first spoken utterance, and bypassing performing further processing based on an ongoing spoken utterance from the second user. In some implementations, the first selectable element and the second selectable element are rendered at the display interface of the computing device while the first user is providing the first spoken utterance and the second user is providing the second spoken utterance. In some implementations, the first selectable element includes dynamic content that is updated in real-time to embody the first spoken utterance or another ongoing spoken utterance provided by the first user.

I claim:

1. A method implemented by one or more processors, the method comprising:
   processing, at a computing device, audio data that captures a first spoken utterance, spoken by a first user, and a second spoken utterance, spoken by a second user,
      wherein at least a portion of the first spoken utterance overlaps with at least a portion of the second spoken utterance in the audio data;
   determining, based on processing the audio data, that the first spoken utterance provided by the first user embodies a request that is directed to an automated assistant that is accessible via the computing device;
   causing, based on determining that the first spoken utterance embodies the request directed to the automated assistant, an interactive element to be rendered at a graphical user interface of the computing device,
      wherein the interactive element includes natural language content that characterizes the request embodied by the first spoken utterance;
   determining, based on processing the audio data, whether the second spoken utterance embodies an additional request that is directed to the automated assistant; and
   when the second spoken utterance is determined to embody the additional request directed to the automated assistant:
      causing an additional interactive element to be rendered at the graphical user interface of the computing device,
         wherein the additional interactive element includes additional natural language content that characterizes the additional request embodied by the second spoken utterance;
   receiving a selection of the interactive element or the additional interactive element; and
   responsive to receiving the selection:
      when the selection is of the interactive element:
         causing the automated assistant to initialize one or more actions in furtherance of fulfilling the request and
      determining whether the additional interactive element has been selected at the graphical user interface within a threshold period of time, and
      when the additional interactive element has been selected within the threshold period of time:
      causing the automated assistant to initialize the one or more other actions in furtherance of fulfilling the additional request embodied in the second spoken utterance, and
      when the additional interactive element has not been selected within the threshold period of time:
      bypassing causing the automated assistant to initialize the one or more other actions in furtherance of fulfilling the additional request embodied in the second spoken utterance; and when the selection is of the additional interactive element:
    causing the automated assistant to initialize one or more other actions in furtherance of fulfilling the additional request.

2. The method of claim 1, wherein causing the interactive element to be rendered at the graphical user interface of the computing device is performed responsive to determining that the request is directed to the automated assistant by the first user.

3. The method of claim 1, further comprising:
when the second spoken utterance is determined to not embody the additional request directed to the automated assistant:
    bypassing causing the additional interactive element to be rendered at the graphical user interface of the computing device.

4. The method of 1, further comprising:
when the selection is of the additional interactive element:
    bypassing causing the automated assistant to initialize the one or more actions in furtherance of fulfilling the request.

5. The method of claim 1, further comprising:
determining that the first user is a primary user relative to the second user; and
in response to determining that the first user is the primary user relative to the second user:
    causing the interactive element to be rendered more prominently than the additional interactive element.

6. The method of claim 5, wherein causing the interactive element to be rendered more prominently than the additional interactive element includes:
    causing the interactive element to be rendered above the additional interactive element and/or larger than the additional interactive element.

7. The method of claim 5, wherein determining that the first user is the primary user includes:
    determining that the first spoken utterance matches a voice profile that is accessible via the computing device as a primary voice profile for the computing device.

8. The method of claim 7, wherein determining that the first user is the primary user includes:
    determining that the first spoken utterance matches a voice profile determined to match a prior spoken utterance,
        wherein the prior spoken utterance received is received prior to the first spoken utterance and the second spoken utterance.

9. The method of claim 8, wherein determining that the first user is the primary user includes:
    determining, based on vision data from one or more vision sensors of the computing device, that the first user is a most proximal user, of at least the first user and the second user, relative to the computing device, and determining that the first spoken utterance is from the first user.

10. A system for processing concurrently received utterances from multiple users comprising one or more hardware processors; and memory storing instructions that, when executed, cause the one or more hardware processors to be operable to:
    process, at a computing device, audio data that captures a first spoken utterance, spoken by a first user, and a second spoken utterance, spoken by a second user, wherein at least a portion of the first spoken utterance overlaps with at least a portion of the second spoken utterance in the audio data;
    determine, based on processing the audio data, that the first spoken utterance provided by the first user embodies a request that is directed to an automated assistant that is accessible via the computing device;
    cause, based on determining that the first spoken utterance embodies the request directed to the automated assistant, an interactive element to be rendered at a graphical user interface of the computing device,
        wherein the interactive element includes natural language content that characterizes the request embodied by the first spoken utterance;
    determine, based on processing the audio data, whether the second spoken utterance embodies an additional request that is directed to the automated assistant; and
    when the second spoken utterance is determined to embody the additional request directed to the automated assistant:
        cause an additional interactive element to be rendered at the graphical user interface of the computing device,
            wherein the additional interactive element includes additional natural language content that characterizes the additional request embodied by the second spoken utterance;
    receive a selection of the interactive element or the additional interactive element; and
    responsive to receiving the selection:
        when the selection is of the interactive element:
            cause the automated assistant to initialize one or more actions in furtherance of fulfilling the request and
            determine whether the additional interactive element has been selected at the graphical user interface within a threshold period of time, and
                when the additional interactive element has been selected within the threshold period of time:
                    cause the automated assistant to initialize the one or more other actions in furtherance of fulfilling the additional request embodied in the second spoken utterance and
                when the additional interactive element has not been selected within the threshold period of time:
                    bypass causing the automated assistant to initialize the one or more other actions in furtherance of fulfilling the additional request embodied in the second spoken utterance and
        when the selection is of the additional interactive element:
            cause the automated assistant to initialize one or more other actions in furtherance of fulfilling the additional request.

11. The system of claim 10, wherein causing the interactive element to be rendered at the graphical user interface of the computing device is performed responsive to determining that the request is directed to the automated assistant by the first user.

12. The system of claim 10, wherein when the second spoken utterance is determined to not embody the additional request directed to the automated assistant the one or more hardware processors are operable to:
    bypass causing the additional interactive element to be rendered at the graphical user interface of the computing device.

13. The system of claim 10, wherein when the selection is of the additional interactive element the one or more hardware processors are operable to:
   bypass causing the automated assistant to initialize the one or more actions in furtherance of fulfilling the request.

14. The system of claim 10, wherein the one or more hardware processors are operable to:
   determine that the first user is a primary user relative to the second user; and
   in response to determining that the first user is the primary user relative to the second user:
   cause the interactive element to be rendered more prominently than the additional interactive element.

15. The system of claim 14, wherein in causing the interactive element to be rendered more prominently than the additional interactive element the one or more hardware processors are operable to:
   cause the interactive element to be rendered above the additional interactive element and/or larger than the additional interactive element.

16. The system of claim 14, wherein in determining that the first user is the primary user the one or more hardware processors are operable to:
   determine that the first spoken utterance matches a voice profile that is accessible via the computing device as a primary voice profile for the computing device.

17. The system of claim 16, wherein in determining that the first user is the primary user the one or more hardware processors are operable to:
   determine that the first spoken utterance matches a voice profile determined to match a prior spoken utterance,
   wherein the prior spoken utterance received is received prior to the first spoken utterance and the second spoken utterance.

18. The method of claim 17, wherein in determining that the first user is the primary user the one or more hardware processors are operable to:
   determine, based on vision data from one or more vision sensors of the computing device, that the first user is a most proximal user, of at least the first user and the second user, relative to the computing device, and determining that the first spoken utterance is from the first user.

* * * * *